（12）United States Patent
Gongaware et al.

(10) Patent No.: US 10,032,066 B2
(45) Date of Patent: Jul. 24, 2018

(54) SECURE COMMUNICATION SYSTEMS AND METHODS

(71) Applicant: Intelmate LLC, San Francisco, CA (US)

(72) Inventors: Grant Gongaware, San Francisco, CA (US); Nicolas Garcia, Oakland, CA (US); Richard Torgersrud, San Francisco, CA (US); Peter Kelley Sheerin, Foster City, CA (US)

(73) Assignee: Intelmate LLC, San Francisco, CA (US)

( * ) Notice: Subject to any disclaimer, the term of this patent is extended or adjusted under 35 U.S.C. 154(b) by 0 days.

(21) Appl. No.: 14/948,223

(22) Filed: Nov. 20, 2015

(65) Prior Publication Data

US 2016/0078281 A1 Mar. 17, 2016

Related U.S. Application Data

(60) Division of application No. 13/844,281, filed on Mar. 15, 2013, now Pat. No. 9,225,701, which is a (Continued)

(51) Int. Cl.
*G06K 9/00* (2006.01)
*H04L 29/06* (2006.01)
(Continued)

(52) U.S. Cl.
CPC ......... *G06K 9/00255* (2013.01); *G06F 21/31* (2013.01); *G06F 21/32* (2013.01);
(Continued)

(58) Field of Classification Search
CPC ............ G06K 9/00255; G06K 9/00288; H04L 63/0861
(Continued)

(56) References Cited

U.S. PATENT DOCUMENTS 5,623,539 A 4/1997 Bassenyemukasa et al.
5,729,741 A 3/1998 Liaguno et al.
(Continued)

FOREIGN PATENT DOCUMENTS

GB 2342802 A 4/2000

OTHER PUBLICATIONS

Boyle, P., "Image Recognition Software Can Help Cops ID Gang Graffiti Automatically," Nov. 17, 2011, retrieved from <http://www.popsci.com/technology/article/2011-11/image-recognition-software-can-help-cops-id-gang-graffiti-automatically>.
(Continued)

*Primary Examiner* — Matthew T Henning
(74) *Attorney, Agent, or Firm* — Venable LLP; Jeffri A. Kaminski; Leslie A. Lee

(57) ABSTRACT

Systems and methods for determining whether a communication session is authorized are provided. In some aspects, a method includes initiating a communication session between a first user and a second user, and obtaining an identity attribute associated with a third user engaged in the communication session. The method also includes determining whether the third user is the first user, the second user, or an unauthorized user based on the obtained identity attribute. The method also includes determining whether the communication session is authorized based on whether the third user is determined to be the first user, the second user, or the unauthorized user.

5 Claims, 20 Drawing Sheets

Related U.S. Application Data continuation-in-part of application No. 13/088,883, filed on Apr. 18, 2011, now Pat. No. 9,030,292.

(51) Int. Cl.
| | |
|---|---|
| *G06F 21/31* | (2013.01) |
| *G06F 21/32* | (2013.01) |
| *H04M 3/42* | (2006.01) |
| *H04M 3/38* | (2006.01) |

(52) U.S. Cl.
CPC .......... *G06K 9/00288* (2013.01); *H04L 63/08* (2013.01); *H04L 63/0861* (2013.01); *H04L 65/1069* (2013.01); *H04L 65/403* (2013.01); *H04M 3/38* (2013.01); *H04M 3/4228* (2013.01); *H04L 63/10* (2013.01)

(58) Field of Classification Search
USPC .............................................. 726/4; 382/118
See application file for complete search history.

(56) References Cited

U.S. PATENT DOCUMENTS

| | | | | |
|---|---|---|---|---|
| 5,991,429 | A | * | 11/1999 | Coffin ................ G06K 9/00255 382/118 |
| 6,665,380 | B1 | | 12/2003 | Cree et al. |
| 7,403,766 | B2 | | 7/2008 | Hodge |
| 7,522,060 | B1 | | 4/2009 | Tumperi et al. |
| 7,529,357 | B1 | | 5/2009 | Rae et al. |
| 7,783,021 | B2 | | 8/2010 | Hodge |
| 7,853,243 | B2 | | 12/2010 | Hodge |
| 7,953,254 | B2 | | 5/2011 | Seo |
| 7,995,713 | B2 | | 8/2011 | Fratti |
| 8,036,892 | B2 | | 10/2011 | Broman et al. |
| 8,237,742 | B2 | | 8/2012 | Basson et al. |
| 8,295,446 | B1 | | 10/2012 | Apple et al. |
| 8,340,260 | B1 | | 12/2012 | Rae et al. |
| 8,922,480 | B1 | * | 12/2014 | Freed ................ G09G 5/00 345/156 |
| 2002/0101512 | A1 | | 8/2002 | Klapman et al. |
| 2004/0003079 | A1 | | 1/2004 | Aiu et al. |
| 2004/0151347 | A1 | * | 8/2004 | Wisniewski ....... G06K 9/00221 382/115 |
| 2005/0046697 | A1 | * | 3/2005 | VanCleave ............... H04N 7/18 348/150 |
| 2005/0159958 | A1 | | 7/2005 | Yoshimura |
| 2006/0259755 | A1 | | 11/2006 | Kenoyer |
| 2006/0285667 | A1 | | 12/2006 | Hodge |
| 2007/0041517 | A1 | | 2/2007 | Clarke et al. |
| 2007/0071206 | A1 | | 3/2007 | Gainsboro et al. |
| 2008/0129816 | A1 | | 6/2008 | Mattila et al. |
| 2009/0103711 | A1 | | 4/2009 | Conway et al. |
| 2009/0119106 | A1 | | 5/2009 | Rajakumar et al. |
| 2009/0215533 | A1 | * | 8/2009 | Zalewski ................ A63F 13/00 463/32 |
| 2010/0039500 | A1 | * | 2/2010 | Bell ................... H04N 13/0253 348/46 |
| 2010/0114575 | A1 | | 5/2010 | Itoh et al. |
| 2010/0205667 | A1 | * | 8/2010 | Anderson ............... G06F 3/013 726/19 |
| 2010/0259500 | A1 | | 10/2010 | Kennedy |
| 2010/0313276 | A1 | | 12/2010 | Banti et al. |
| 2011/0047473 | A1 | | 2/2011 | Hanna et al. |
| 2011/0088086 | A1 | | 4/2011 | Swink et al. |
| 2011/0206244 | A1 | * | 8/2011 | Munoz-Bustamante ........................ G06K 9/00288 382/118 |
| 2011/0288866 | A1 | | 11/2011 | Rasmussen |
| 2011/0317820 | A1 | | 12/2011 | Torgersrud et al. |
| 2012/0008875 | A1 | | 1/2012 | Martensson |
| 2012/0224678 | A1 | | 9/2012 | Walters et al. |
| 2012/0249328 | A1 | | 10/2012 | Xiong |
| 2012/0262271 | A1 | | 10/2012 | Torgersrud et al. |
| 2013/0044867 | A1 | | 2/2013 | Walters et al. |
| 2013/0057693 | A1 | * | 3/2013 | Baranek ............. G06K 9/00771 348/152 |
| 2013/0070090 | A1 | * | 3/2013 | Bufalini .............. G06F 19/3462 348/143 |
| 2013/0136363 | A1 | * | 5/2013 | Na ..................... G06F 17/30047 382/190 |
| 2013/0227651 | A1 | * | 8/2013 | Schultz ................... G06F 21/32 726/4 |

OTHER PUBLICATIONS

Campbell, et al., "Corpora for the Evaluation of Speaker Recognition Systems," 1999, <http://www.ll.mit.edu/mission/communications/ist/publications/ICASSP99_Campbell.pdf>.

Campbell,. et al., "SVM Based Speaker Verification Using a GMM Supervector Kernel and NAP Variability Compensation," 2006, <http://www.ll.mit.edu/mission/communications/publications/publication-files/full_papers/060514_CampbellW.pdf>.

Karam, et al., "A New Kernel for SVM MLLR based Speaker Recognition," 2007, <http://www.ll.mit.edu/mission/cybersec/publications/publication-files/full_papers/07-08-27_CampbellW_Interspeech_MS-29055-FP.pdf>.

Liu, et al., "Key Frame Extraction from MPEG Video Stream," Proceedings of the Second Symposium International Computer Science and Computational Technology, Dec. 2009, pp. 7-11.

Paul, D.B., "Speech Recognition Using Hidden Markov Models," The Lincoln Laboratory Journal, 1990, vol. 3, No. 1.

Reynolds, D.A., "Automatic Speaker Recognition Using Gaussian Mixture Speaker Models," The Lincoln Laboratory Journal, 1995, vol. 8, No. 2.

Reynolds, et al., "Automatic Speaker Recognition Recent Progress, Current Applications, and Future Trends", Presented at the AAAS 2000 Meeting Humans, Computers and Speech Symposium, Feb. 19, 2000.

"Speaker Recognition," NSTC Committee on Technology, Committee on Homeland and National Security, Subcommittee on Biometrics, Aug. 2006.

Brochure: "The Investigator Pro" JLG Technologies, LLC 2012, <http://jlgtechnologies.com/resources/index.shtml>.

Faraj, et al., "Speaker and digit recognition by audio-visual lip biometrics," Advances in Biometrics Lecture Notes in Computer Science, 2007, vol. 4642 Abstract only.

Glasser, A., "Designing better speaker verification systems: bridging the gap between creators and implementers of investigatory voice biometric technologies," Forensic Speaker Recognition, 2012 Abstract only.

Melin, et al., "Human recognition using face, fingerprint and voice," Hybrid Intelligent Systems for Pattern Recognition Using Soft Computer Studies in Fuzziness and Soft Computing, 2005, vol. 172, Abstract only.

Ortega-Garcia, et al., "From biometrics technology to applications regarding face, voice, signature and fingerprint recognition systems," The Springer International Series in Engineering and Computer Science, 2002, vol. 697 Abstract only.

\* cited by examiner

Figure 16

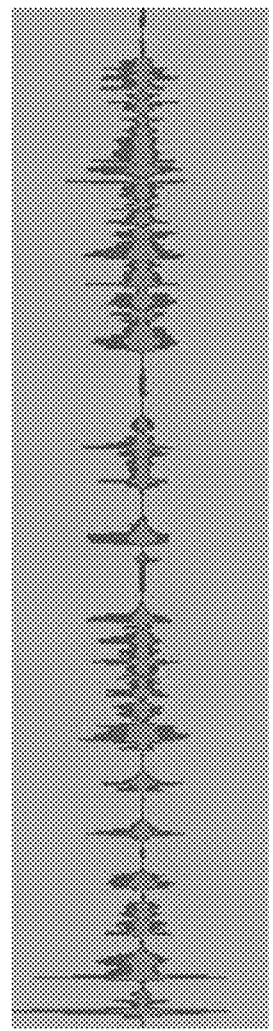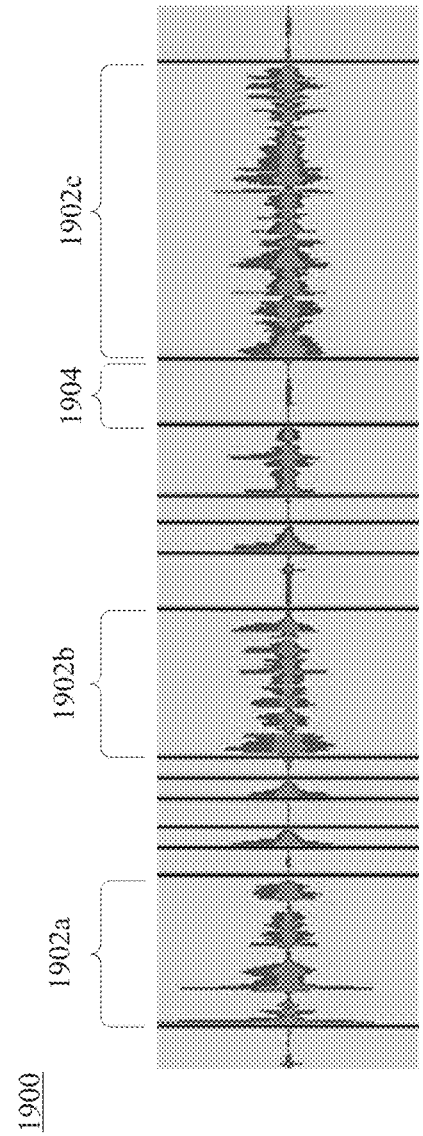

SECURE COMMUNICATION SYSTEMS AND METHODS

CROSS-REFERENCES TO RELATED APPLICATIONS

The present application claims the benefit of priority under 35 U.S.C. § 120 as a divisional of U.S. patent application Ser. No. 13/844,281, entitled "Secure Communication Systems and Methods." filed on Mar. 15, 2013, which claims the benefit of priority under 35 U.S.C. § 120 as a continuation-in-part of U.S. patent application Ser. No. 13/088,883, entitled, "Interactive Audio/Video System and Device for Use in a Secure Facility," filed on Apr. 18, 2011, now U.S. Pat. No. 9,030,292, issued on May 12, 2015, the disclosures of which are hereby incorporated by reference in their entirety for all purposes.

FIELD

The subject technology generally relates to communications, and more particularly to the use of secure communication systems to provide communications.

BACKGROUND

Detention environments, such as jails, prisons, detention facilities, secured hospitals, or addiction treatment facilities, may house large populations of individuals in confinement, which presents unique administrative challenges. In such detention environments, detained individuals may frequently desire to communicate with individuals outside the detention environment (outside parties) such as friends or family members. A variety of methods may be used to support such communications, including in-person visits (e.g., in which both a detained individual and a visitor may be in the same room, such as in lower security facilities or for low-risk detainees) or in a special visitation room (e.g., where the parties are separated by thick glass or plastic, and may communicate via wired telephone equipment on both sides of the partition). The costs and security measures associated with these methods of communication can be significant for both the facilities and the visitors.

SUMMARY

According to various aspects of the subject technology, a computer-implemented method is provided for determining whether a communication session is authorized. The method includes initiating a communication session between a first user and a second user, and obtaining an identity attribute associated with a third user engaged in the communication session. The method also includes determining whether the third user is the first user, the second user, or an unauthorized user based on the obtained identity attribute. The method also includes determining whether the communication session is authorized based on whether the third user is determined to be the first user, the second user, or the unauthorized user.

According to various aspects of the subject technology, an apparatus comprising memory and a processor is provided. The memory includes instructions for determining whether a communication session between a first user and a second user is authorized. The processor is configured to execute the instructions to: initiate the communication session; obtain an identity attribute associated with a third user engaged in the communication session; determine whether the third user is the first user, the second user, or an unauthorized user based on the obtained identity attribute; and determine whether the communication session is authorized based on whether the third user is determined to be the first user, the second user, or the unauthorized user.

According to various aspects of the subject technology, a machine-readable medium comprising instructions for a method of determining whether a communication session is authorized is provided. The method includes initiating a communication session between a first user and a second user, and obtaining an identity attribute associated with a third user engaged in the communication session. The method also includes determining whether the third user is the first user, the second user, or an unauthorized user based on the obtained identity attribute. The method also includes determining whether the communication session is authorized based on whether the third user is determined to be the first user, the second user, or the unauthorized user.

According to various aspects of the subject technology, a computer-implemented method for determining identity attribute variations of a user is provided. The method includes obtaining an identity attribute of a first user and comparing the identity attribute of the first user to a stored identity attribute of an authorized user who is authorized to engage in a communication session. The method also includes determining that the first user is authorized to engage in the communication session if the identity attribute of the first user matches the identity attribute of the authorized user. If the identity attribute of the first user does not match the identity attribute of the authorized user, the method also includes: flagging the identity attribute of the first user for review by an investigator; receiving verification from the investigator that the flagged identity attribute of the first user is or is not a variant of the identity attribute of the authorized user; and determining that the identity attribute of the first user is the variant of the identity attribute of the authorized user if the verification indicates that the flagged identity attribute of the first user is the variant.

According to various aspects of the subject technology, a computer-implemented method for identifying users is provided. The method includes obtaining an identity attribute of a first user. The identity attribute of the first user includes a first behavior. The method also includes comparing the identity attribute of the first user to a stored identity attribute of a second user. The identity attribute of the second user includes a second behavior. The method also includes determining whether the first user is the second user based on the comparison.

According to various aspects of the subject technology, a computer-implemented method for enhancing facial recognition accuracy is provided. The method includes initiating, by a first device comprising a camera, an interactive session with a first user. The method also includes surreptitiously directing the first user to engage in one or more activities in front of the camera such that the first user is positioned at a plurality of different angles relative to the camera. The method also includes capturing, with the camera, a plurality of images of the first user when the first user is positioned at the plurality of different angles. The method also comprises using the plurality of images to perform facial recognition of the first user.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

FIG. 16 illustrates an example kite screen of the kiosk interface.

FIGS. 19A and 19B illustrate an example audio that may be displayed.

DETAILED DESCRIPTION

Figure 1:
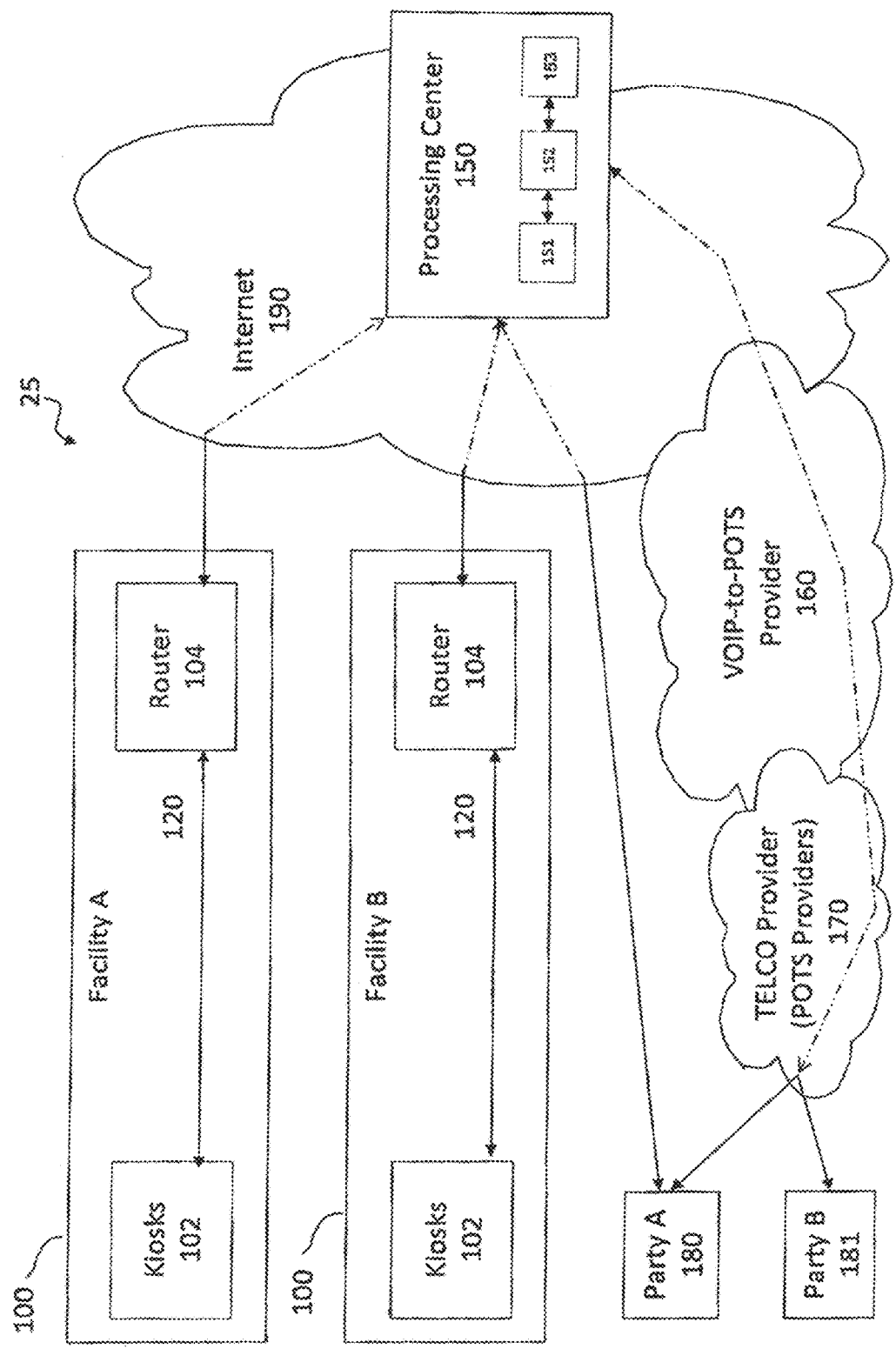
FIG. 1 illustrates an embodiment of the interactive audio/video platform.

In the following detailed description, numerous specific details are set forth to provide a full understanding of the subject technology. It will be apparent, however, that the subject technology may be practiced without some of these specific details. In other instances, structures and techniques have not been shown in detail so as not to obscure the subject technology.

Detention environments often have telephone systems installed specifically for use by inmates. These systems, commonly known as Inmate Telephone Systems, allow detainees to call individuals residing outside secure facilities, and such calls may be limited to pre-authorized and identity-verified individuals, or may be fairly unrestricted, limited only by a facility-maintained "prohibited contact list," or anything in between. One such system is described in U.S. Patent Application Publication No. 2011/0317820 A1: Central Call Platform, which is incorporated by reference herein.

A detention environment may also have one or more video visitation systems installed, wherein specialized videoconferencing systems are used to allow friends and family members to visit with incarcerated individuals from the lobby of the detention environment (e.g., on-site video visitation), the lobby of another detention environment with a suitable service, or even a computer (e.g., desktop or mobile computer) suitably equipped with a web camera and video conferencing or web browser software. This latter method is commonly called "remote video visitation," and if one or more endpoints are handheld computing devices, the method is commonly called "mobile video visitation." Examples of these systems are described in U.S. Patent Application Publication No. 2012/0262271 A1: Interactive Audio/Video System and Device for Use in a Secure Facility, which is incorporated by reference herein.

One endpoint in these video visitations takes place inside secure facilities in or near the inmates' cells. Custom network computing terminals, such as video visitation kiosks, installed inside these secure facilities for such purposes can be hardened against physical and electronic attempts to circumvent their being used contrary to the facilities' rules, as these are generally owned and operated exclusively by a single company at any particular facility, which has an exclusive contract to provide such equipment and services to that facility.

Secure facilities may require additional levels of monitoring and oversight that are not required when similar services are provided to other populations. Although two-way video conferencing is now quite common on desktop and laptop computers suitably equipped with appropriate hardware and software, and is now becoming available on commonly available computing tablets and smartphones with wireless Internet connections, the increased transportability and concomitant increased usage and propensity to share use of a device with multiple people increases security concerns related to allowing such video visitations for inmates.

The above-described system may be used to interact with a Secure Social Network (SSN), as described in U.S. patent application Publication Ser. No. 13/438,940, which is incorporated by reference herein. In some aspects, the SSN provides a method for facilitating the exchange or transmission of information between members of a social network in which at least one member is subject to limitations of a controlled facility, including the steps of: receiving content in an electronic form from a member for display to members or intended members of the social network; evaluating the received content to determine if it is appropriate for display to the members or intended members of the social network; allowing the received content to be viewed by the members or intended members of the social network only if it is deemed appropriate for display in the evaluating step; and recording data relative to one or more of the receiving, evaluating, and allowing steps.

According to certain aspects, the SSN provides a system for facilitating the exchange or transmission of information between members of a social network in which at least one member is subject to limitations of a controlled facility, including: a data receiving module configured to receive content in an electronic form from a user for display to members or intended members of the social network; an evaluation module configured to evaluate the received content and determine if it is appropriate for display to the members or intended members of the social network; a content dissemination module configured to provide received content that is deemed appropriate by the evaluation module to the members or intended members of the social network for viewing; and a data recording module configured to record data relative to the actions of one or more of the data receiving module, the evaluation module, and the content dissemination module.

Some or all of the foregoing mentioned systems may generally seek specific authorization and individual authentication prior to each use to ensure that only inmates with telecommunications privileges are allowed to communicate, and that they are only able to communicate with individuals residing outside the facility and whom the inmate is allowed to communicate with. For instance, inmates are generally prohibited from communicating with judges, jurors, witnesses, victims, and others involved in their charges or convictions, as well as known felons and gang members.

Aspects of the subject technology include the continuous, real-time or near-real-time use of biometrics to ensure that only persons authenticated and authorized as described above may use these telephone, video visitation, SSN, and/or other communication systems. In some aspects, secure facility operators may elect to allow all or substantially all communications activity to take place, save for blocking communications among individuals prohibited from communicating with each other, for the purpose of intelligence gathering activities, which may both aid the security of the facility and provide law-enforcement officials with a rich source of information relating to criminal activities. The decision of which of these two methods to use may be implemented on a per-facility, per-wing, per-group, or per-inmate basis, at the discretion of the facility administrators and investigators.

For instance, allowing communications containing persons who might be in a category prohibited from communicating with any inmate or the particular one involved in the communication in question, at least for one to several occurrences, may also allow for the recording, archiving, and analysis of small-to-large amounts of audio and video streams and other activity by inmates using these communications terminals. Commonly called "data mining," this often large-scale analysis of data and patterns therein can uncover links between and among individual users of the system that may otherwise have gone undetected by facility administrators and law-enforcement officials.

According to various aspects of the subject technology, voice comparison techniques (e.g., using commercial off-the-shelf voice comparison software and/or other suitable software) may be used in novel ways to perform voice recognition on persons using telephone and/or video communications related to secure facilities, such as in the case of inmate telephone and visitation systems, to ensure only authorized individuals communicate. In some aspects, facial recognition techniques may be used to limit and authenticate access to devices used by inmates to communicate with outsiders, and to limit and authenticate access to software and terminals capable of interacting with the devices to only individuals authorized to communicate with any particular inmate. In some aspects, tools are provided to otherwise analyze above-mentioned images and/or videos on a broader basis, thereby allowing a catalog of all individuals and/or objects recognized in all images and videos uploaded to the system to be built, regardless of which facility or individual they are intended for, for the purpose of creating an investigative tool.

Voice and/or facial biometrics may be used to authenticate users, to identify other persons involved in communications sessions, and to sleuth out previously unknown links among users of the system. A biometrics system may be used to identify individuals. The system may use these biometric profiles to identify individuals appearing in any and all content passing through or otherwise available to the system. Other software may then search for connections (e.g., using six-degrees-of-separation principles) to find possible links among inmates and their contacts.

According to various aspects of the subject technology, voiceprint matching (e.g., using continuous voice biometrics) may be used as an additional verification step when inmates log into an inmate communication system (e.g., Inmate Telephone System). In some aspects, the same capability may be used to detect when one inmate logs in using his personal identification number (PIN) and voice, then hands the telephone to another inmate. This practice may be commonly the result of fraud (e.g., a first inmate offering use of his login for a second inmate to avoid restrictions on whom the latter can call, or even an outright prohibition on making any calls), and also intimidation (e.g., a third inmate forcing a fourth inmate to allow the use of the fourth inmate's phone account funds for use by the third inmate).

According to certain aspects, use of a touch-screen to encourage and allow capture of different angles of a user's face can be used to enroll and verify the user. In some aspects, use of image and/or video-based facial recognition on a frequent or continual basis for controlling access to non-video communications, such as instant messaging and social networking, by only the authorized account holder. Voiceprint-comparison software libraries and/or facial recognition software may be used (e.g., with video visitation systems, telephone terminals, computers, mobile devices, etc.).

According to various aspects of the subject technology, an algorithm is provided that creates audio and/or video "chunks" (e.g., short segments of the media) that are long enough to allow high-accuracy biometric identification, yet short enough to capture changes in an individual (e.g., a single human) speaking or appearing in the audio and/or video. In some aspects, at least 3 seconds of media may be collected for each user (e.g., excluding periods of silence). In some aspects, better match reliability may be achieved with between 9 and 12 seconds of media (e.g., excluding periods of silence). In some aspects, an optimum length may be between 30 and 45 seconds of media collected. However, it is understood that the length of media collected may be greater than or less than this range. According to certain aspects, data mining (e.g., including image cataloging), may be used to identify as many individual as possible appearing in communication sessions and/or in imported or linked social network systems, and to identify connections, relationships, and interactions among them.

Aspects of the subject technology provide various improvements over other approaches. For example, no other known system encourages a user to look in different directions so as to increase the number of photos of the face, and in particular, the number of unique angles at which the photos are taken, so as to increase the accuracy of facial recognition. Furthermore, no other known system allows images to be transmitted between inmates and outsiders operates across multiple facilities and pools the images in a manner that allows data mining operations, especially for the purpose of detecting individuals appearing in the same or different photos uploaded to more than one inmate at the same facility or a plurality of facilities.

Aspects of the subject technology use a variety of voice, image, video, biometric, and/or other types of comparison and analysis to enhance overall security and/or to manage communications among inmates of secure or constrained facilities and persons outside the control or constraints of said facilities (e.g., as an investigative tool).

Aspects of the subject technology use a central call platform as described in U.S. Patent Application Publication No. 2011/0317820, which is incorporated by reference herein. Call platforms may enable management and call processing for facilities managing large volumes of telephone calls. Call platforms have been used in secure facilities, such as prisons and other government detention centers, to enable communications between residents and people outside the facilities. Unfortunately, extensive call processing hardware may be needed at each individual facility in existing implementations of these platforms.

Existing call platforms for secure facilities utilize standardized Private Branch Exchange (PBX) equipment, such as that used in office telephone systems. These systems, however, may not provide the specific functions required for communications in secure facilities, including live call monitoring, forced call termination, and enhanced load balancing. Additionally, standard PBX software may allow only minimal audio recording functionality, and limited archival capabilities. PBX implementations may require the installation of specialized equipment for the recording of calls, and call processing may be performed on-site using dedicated equipment.

PBX systems may also need to be deployed individually for each facility. Management and access to these systems may be dispersed, often requiring multiple physical computers and other hardware dedicated to each served institution. Some so-called "Offsite" or "Multi-Facility" solutions exist, but they may not be centralized across facilities, and may typically involve a traditional on-site communications system that is extended to an off-site facility only superficially. These systems simply include a communications link between the facility and another location storing the traditional equipment.

Secure facilities may typically be located in remote locations and may not be well suited for hosting digital call processing hardware. There are problems with cooling, dust, and power regulation that often cause increased hardware failure. In addition, repair staff may need to travel to the facility with replacement hardware before the facility can be brought back online. Thus, there exists a need for a centralized call platform for use at secure facilities that uses a minimal amount of facility-hosted equipment while also providing the advantageous features of a centralized platform.

Aspects of the subject technology also use the interactive audio/video system and device for use in a secure facility as described in U.S. Patent Application Publication No. 2012/0262271, which is incorporated by reference herein. The customized interactive audio/video platform may include, among other things, kiosks at secure facilities that are interconnected via a central processing platform providing enhanced security and monitoring services. The kiosks provide, among other things, telephony services, video conferencing, text messaging, tele-medical services, religious and educational services, commissary services, and entertainment services. The services are provided in a manner that meets the strict guidelines of a secured facility such as, e.g., a prison or jail.

FIG. 1 illustrates an embodiment of an example interactive audio/video platform 25 that includes kiosks 102 for providing administrative services at multiple facilities 100. The platform 25 includes a processing center 150 connected to one or more facilities 100 through a network such as, e.g., the Internet 190. Facilities 100 may be any facilities using voice, video and/or information services, especially those with security requirements and a large traffic volumes, including secure facilities such as prisons or other government detention facilities. Each facility 100 contains at least one kiosk 102. Each kiosk 102 is connected to a router 104 via a networking link 120. The routers 104 are configured to communicate with the processing center 150, which may be distributed across several locations. The routers 104 each connect the communications received from the kiosks 102 to the Internet 190, and exchange IP (Internet Protocol) packets bidirectionally between the processing center 150 and facility 100. The processing center 150 includes application hardware and software for data processing and the other functions described below.

The processing center 150 is a system that is distributed across multiple clusters 151-153, which may or may not be geographically diverse (described below in more detail). Each cluster 151-153 hosts multiple nodes, including an application node, a database node, and a traffic processing node (discussed below in relation to FIG. 2). The clusters 151-153 communicate with each other via the Internet or dedicated connections, and information in any database node can be shared among the clusters 151-153. Data storage and retrieval can be performed across several clusters. The clusters 151-153 can also provide fail-over for one another, and routers 104 at each facility may be configured to communicate with another cluster if a primary cluster is unavailable. Similarly, resources of the nodes within a cluster (which may include multiple computers) can be reallocated as processing needs require.

One function of the processing center 150 is to route communications from facility residents using kiosks 102 to outside parties 180, 181. The processing center 150 routes voice, text, and/or video traffic from facility kiosks 102 to their ultimate destinations 180, 181. To route voice communications traffic, the processing center 150 communicates via internet protocol to a voice over internet protocol to public switched telephone network "VoIP-to-PSTN" provider 160, which converts VoIP communications to PSTN communications. Example VoIP-to-PSTN providers 160 include Paetech, Level 3, and Verizon. After converting the VoIP signal to a PSTN signal, the VoIP-to-PSTN provider 160 provides the communication to a telecommunications provider 170 that routes the call to the called parties 180, 181.

The processing center 150 may be in communication with multiple VoIP-to-PSTN providers 160, and may route communications to any one of the providers 160 based on various factors including time-of-day, load, or rates. Similarly, the processing center 150 or the VoIP-to-PSTN provider 160 may route calls to various telecommunications providers 170 based on factors including time-of-day, load, or rates. For example, VoIP-to-PSTN providers 160 often have connection limits. Therefore, the processing center 150 may be configured to first attempt a connection to a primary VoIP-to-PSTN provider 160 with a low rate for a given call destination. If that connection is refused, then the processing center 150 would be configured to attempt connections to a second, and perhaps third VoIP-to-PSTN provider 160 until a connection is established.

The processing center 150 can also receive calls from outside parties 180, 181 and route the calls to facility kiosks 102. The VoIP-to-PSTN provider 160 may convert the PSTN signal to a VoIP signal before the communication is sent to the processing center 150. Alternatively, although not shown in FIG. 1, the outside callers 180, 181 may place a call using the traditional telecommunications provider 170 and may be directly connected to the processing center 150 where the signal is converted using an A/D converter. The processing center can connect outside callers 180, 181 to residents and can also allow outside callers 180, 181 to leave voicemail messages.

The processing center 150 also routes video and text communications. Communications received from facility routers 104 are stored or cached on web servers in the processing center 150 or on third party web servers. In addition to storing communications routed through the processing center 150, the processing center 150 may be configured to receive and store recordings of local communications that have been recorded at the facilities 100 (e.g., local video communications). The communications stored at the processing center 150 can be accessed by an outside party 180, 181 by using a web browser on a computer connected to the Internet 190. The processing center is also configured to receive requests for data from the routers 104, such as hypertext transfer protocol (HTTP) requests, and return information to the routers 104, such as information on a third party website.

Another function of the processing center 150 is to log information into databases. The processing center 150 logs all voice and data traffic, and may record voice or video traffic according to predefined rules. The processing center 150 also logs all failed and/or blocked communication attempts, such as attempts to call third parties that a facility resident is prohibited from contacting. Local activity logs on the kiosks 102 may be periodically uploaded to the processing center 150.

Figure 2:
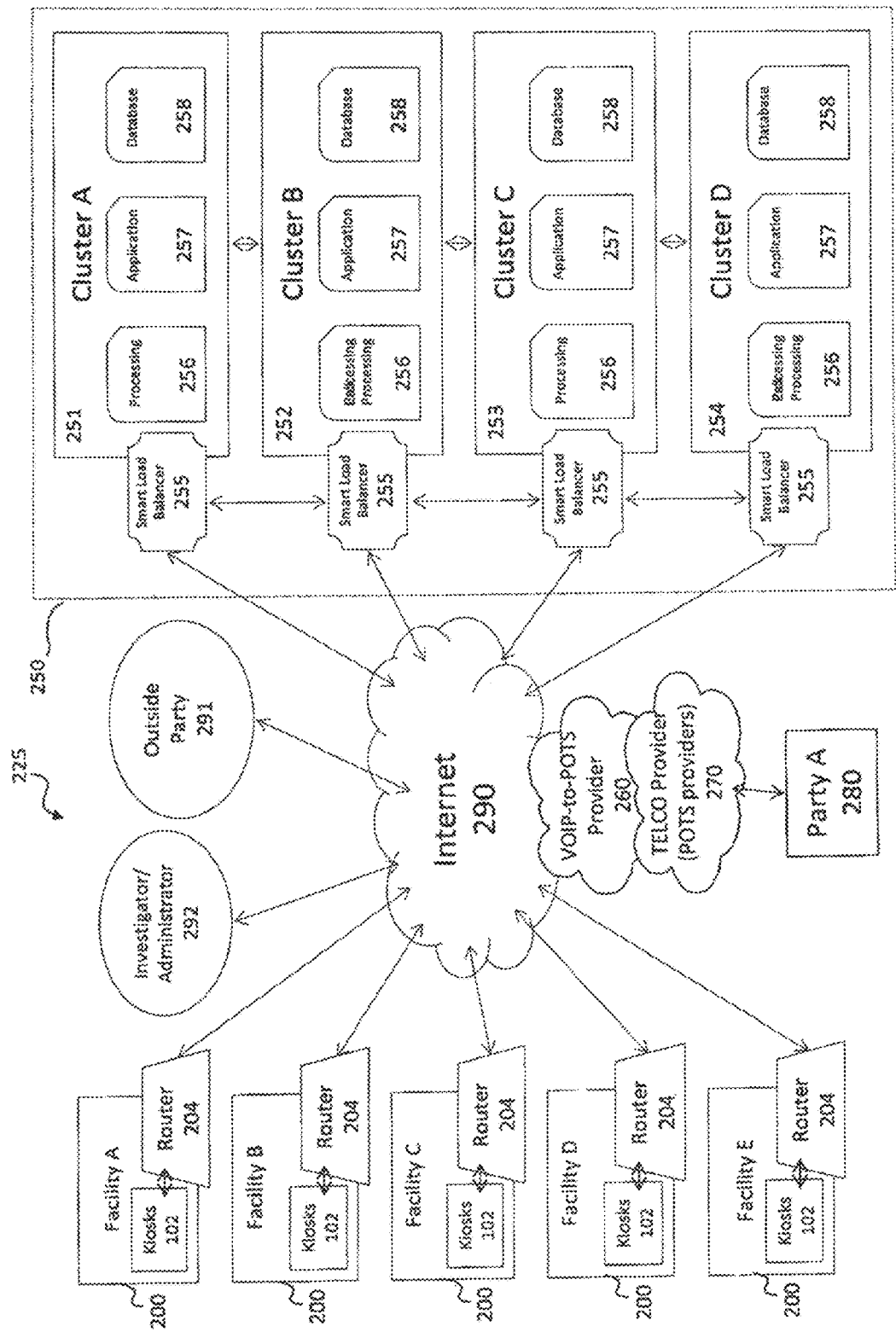
FIG. 2 illustrates the organization and interaction of clusters of another embodiment of the interactive audio/video platform.

FIG. 2 is a system diagram showing the organization and interaction of clusters of another example interactive audio/video platform 225. FIG. 2 illustrates multiple facilities 200, each connected to the Internet 290 via a router 204. The facilities 200, which may include at least one kiosk, communicate, via the Internet 290, with a processing center 250 that is made up of multiple call clusters 251-254.

FIG. 2 illustrates a first central processing cluster 251 in location A, a second central processing cluster 252 in location B, a third central processing cluster 253 in location C, and a fourth central processing cluster 254 in location D. The central processing clusters 251-254 together operate as the processing center 250, and each cluster may include one or many computers functioning together to perform various tasks. The central processing clusters 251-254 may be located in different geographic regions, and one or more of the central processing clusters 251-254 may function as backup clusters or overflow clusters, operating only when other clusters are unavailable or overloaded.

The routers 204 at each facility 200 may be configured to route communications for a particular facility to a predetermined central processing cluster, and may be set to route communications to another central processing cluster if the predetermined central processing cluster is unavailable. Alternatively, the routers 204 may be configured to distribute communications across multiple processing clusters according to a predetermined ratio (described below). These two configurations may be used alternatively or in conjunction with one another, and their use could be determined based on the traffic load on a network.

The routers 204 may also be configured to route communications over multiple outbound network connections at each facility 200. The router 204 may be configured to use a second network connection when a first network connection is unavailable. For example, a facility may be serviced (e.g., communication with the outside world) by a DSL line and a T1 line, and the DSL line may be used as a backup when the T1 line becomes unavailable. As mentioned above, a router 204 may also be configured to distribute communications across multiple network connections according to a predetermined ratio. For example, if a facility is serviced by multiple T1 lines, the router 204 may be configured to distribute the call-data load across the T1 lines to a single cluster, or multiple clusters, allowing a large capacity of calls to be carried simultaneously. These configurations may be used alternatively or in conjunction with one another, and their use could be determined based on the traffic load on the network.

Each central processing cluster 251-254 includes multiple nodes each performing various functions. A central processing cluster may be one computer that is divided into virtual servers, each of which is treated as a node in the cluster. Alternatively, each node may be a dedicated computer, or multiple computers can form each node. Servers can be added as necessary to increase capacity of the cluster.

An example cluster for use in a secure facility is now described. Secure facilities, such as prisons, have unique features that can be addressed by the interactive audio/video platform 225. For example, residents have limited access to cash, and so the platform provides various ways of paying for telephone and/or data access. An account is established for each resident, and funding of the account is provided via kiosks, calling cards, and/or an interactive voice response system. Provisioning for outside funding may also be desirable. Accordingly, the platform 225 may provide for funding of an account by an outside party via live customer service, an interactive voice response system, a website, or kiosks in visiting areas of the facilities.

The interactive audio/video platform 225 may also allow collect calls to be placed by residents. A common problem with collect call systems is that, because a called party may not recognize the number or know what individual from the facility is calling, there needs to be a way for a resident to identify himself. In traditional collect call systems, an individual may be allowed to record their name to be played to a called party. This, however, can permit the transmission of a short message without payment for use of the system. Accordingly, the platform 225 may instead retrieve and play an audio clip of the inmate's name that was recorded under supervision, or that was recorded by another party, or generated by a voice synthesizer.

System accounts must be tied to particular facility residents and must be only accessible by those facility residents. To accomplish this, the platform 225 may require a resident, upon accessing the system, to enter a unique PIN number that is associated with the resident. Additional PIN numbers may be required to access voicemail or other secure features. The platform 225 may also include voice and/or facial recognition features, described in more detail below.

Secure facilities also often place restrictions on the communications of residents. Accordingly, the platform 225 is able to automatically restrict a resident from making calls or video and text communications with certain destinations based on restrictions noted in the residents' accounts. Similarly, the platform 225 prevents outside callers from leaving voicemail messages for inmates that are restricted from communicating with the outside caller. The platform 225 may also place time limits on calls, and may include audio and/or video warnings that a call may be cut off due to time restrictions. Additionally, the platform 225 may prevent a resident from accessing certain kiosk features, such as entertainment features, based on a variety of time, facility, or other rules.

Secure facilities also require activity logging and monitoring capabilities. The logging may include storing information such as when a communication was made, to whom, and how long it lasted. Full audio and/or video recording of communications may also be necessary in prisons, for example, where virtually all communications need to be recorded and retrieved by investigators. Investigators may also need to monitor live communications. These functions can be automated by the platform 225. The platform 225 may also be set to not record certain communications, such as communications between an inmate and his attorney or a doctor. This can be automated by including attorney or doctor numbers on a "do-not-record" list for the system or resident's account or by providing an option to request that a communication not be recorded via an interactive response system. The request may be reviewed by a live operator for authenticity, or may be logged for further review to detect abuse.

Each central processing cluster 251-254 includes a data processing node 256. The data processing node 256 hosts data routing, communication recording, and logging functionality. The data processing node 256 may also be responsible for digital signal processing. Audio routing and recording may be used to process and route calls to destination parties, or to record and retrieve voicemail messages or communications records. The data processing node 210 may be one or many computers functioning together to form the node.

The data processing node 256 is responsible for routing communications to telecommunications providers 270 and routing video and data traffic to and from other kiosks 102 or third party servers 203. For telephone calls, a distributed carrier system allows clusters to access multiple VoIP-to-PSTN providers 260 and telecommunications providers 270 to terminate any call. If one carrier is overloaded, the data processing node 256 will seek the next available carrier based on a set of predefined rules that govern priority. Priority can be set based on factors such as rate, time of day, call termination point, and carrier load. The data processing node 256 may optionally track the number of connections sent to a single carrier, and automatically route calls to a different carrier based on the carrier load. Call processing administrators can adjust the priority at any time via a single, dedicated interface.

Each central processing cluster 251-254 includes an application node 257. The application node 257 hosts payment validation, security, user interface, and business logic functionality. Business logic functionality includes all the rules governing communications or information access. This could include, for example, fraud prevention and protection, schedule limits defined per resident, facility, phone, or destination number, or alarms for triggering investigation. The application node 257 is also responsible for implementing rules related to call acceptance, communications blocking, recording, and logging functionality. The application node 257 can be accessed by authorized users via an administrative web page. By accessing the application node, administrators and investigators 240 can retrieve recorded calls, and can review records and adjust settings, such as calling or voicemail permissions for facility residents. Customer service personnel 241 can also use a web page to review issues reported by facility residents or outside callers. The application node 257 may be one or many computers functioning together to form the node.

Each central processing cluster 251-254 also includes a database node 258. The database node hosts settings for the business logic functionality. The database node 258 also stores indexed logs, audio and video communication recordings, voicemail recordings, and settings for individual residents and facilities. The database node 258 may be one or many computers functioning together to form the node. The database nodes 258 at each central processing cluster 251-254 may replicate some or all of the data at another database node. Since some facilities may impose rules regarding the geographic location where their data is stored, the central processing cluster 251-254 may include rules that define the data that the databases will replicate for each facility.

Central processing clusters 251-254 are connected to a communications network and to one another via smart load balancers 255. The smart load balancers 255 may be configured to communicate with one another over the Internet or through a dedicated communications network or link. The smart load balancers 255 may be configured to communicate to periodically update status information stored at each smart load balancer. The smart load balancers 255 can accordingly redirect incoming communications received from routers 204 based on the availability or load on a particular central processing cluster, and can redirect outgoing communications based on the responsiveness of a provider network.

Central processing clusters 251-254 can also share and retrieve data from one another directly via a communications link or over the Internet. For example, if a resident at Facility A makes a request for a voicemail or text message, and the request has been routed to central processing cluster 251, but the desired data is stored on central processing cluster 252, cluster 251 can retrieve the audio from cluster 252 for playback. Similarly, an investigator reviewing recordings via the web site interface can be communicating with the application node 257 using any central processing cluster 251-254 and can retrieve recordings from any cluster. Logs and recordings can be stored at multiple geographically diverse locations and may be backed up at separate locations for redundancy. A central processing cluster 251-254 can identify a storage location of data by referencing a cluster identifier that is included with each piece of call data in a database node 258. Accordingly, the databases storing data do not need to be replicated across clusters (though they can be).

The multiple central processing clusters 251-254 provide full cluster fail-over. That is, if one of the central processing clusters 251-254 fails, the routers 204 at the facilities are configured to automatically seek and connect to another cluster. Similarly, the smart load balancers 255 are configured to redirect incoming and/or outgoing communications when a particular cluster 251-254 is unavailable or non-responsive. In both instances, the other cluster can take over call processing duties and allow communications to continue. Using multiple computers at each node of a cluster ensures that, if a single node in the cluster fails, another node can take over all of the functions of the failed node. Resources of a node in a cluster may be reallocated based on processing requirements. This all happens seamlessly without affecting configurations at the facilities 200 or the routers 204.

Investigators and administrators 292 can access the platform 225 using a computer with a web browser. The web interface of the platform 225 enables investigators and administrators 292 to view logs, listen to and view audio and video recordings, and change configuration settings for their facility. Outside parties 291 can also use a web browser to access a web interface that enables them to create an account, add funds to their account or to a resident account, or send and receive audio, text, and/or video messages to and from a resident, as described in more detail below.

By removing the processing centers 150, 250 from the facility 100, 200 and distributing it across multiple clusters, sensitive computer hardware can be housed in special environmentally controlled and secure hosting environments that may be geographically dispersed. Clusters of computer hardware can operate independent of one another, allowing for redundancy and failovers. If a cluster completely fails, another functional cluster can take over all computing processes. Additionally, an individual cluster is redundant within itself, so that should any node of the cluster fail, resources can be reallocated to perform the required functions of the node.

Computing clusters can handle large volumes of voice and data traffic from multiple locations more effectively than non-cluster solutions. This is a result of clusters being able to adapt to call load and expand capacity as needed. The resources within a cluster 251-254 can also be adjusted dynamically as service needs require. For example, if a call processing node 256 becomes overloaded, resources can be redirected from another node. This applies across clusters 251-254 as well; if a cluster starts to come under heavy load or become nonresponsive, connected clients can be shifted to a different cluster.

Multiple clusters also facilitate maintenance and expansion, as they allow operations at a single location to be interrupted for planned or unplanned servicing without bringing down communications and services. Clusters allow near limitless scalability as service needs expand. This can be accomplished by increasing computing capacity of the cluster, with no downtime. This also leads to hardware cost savings as service capacity can be increased with minimal hardware investment. Services within a cluster can be upgraded, or computing capacity added without affecting service availability. Higher uptime results in enhanced revenue. Fast replacement and maintenance is facilitated by having service personnel and replacement equipment in close proximity to a small number of cluster locations.

Figure 3:
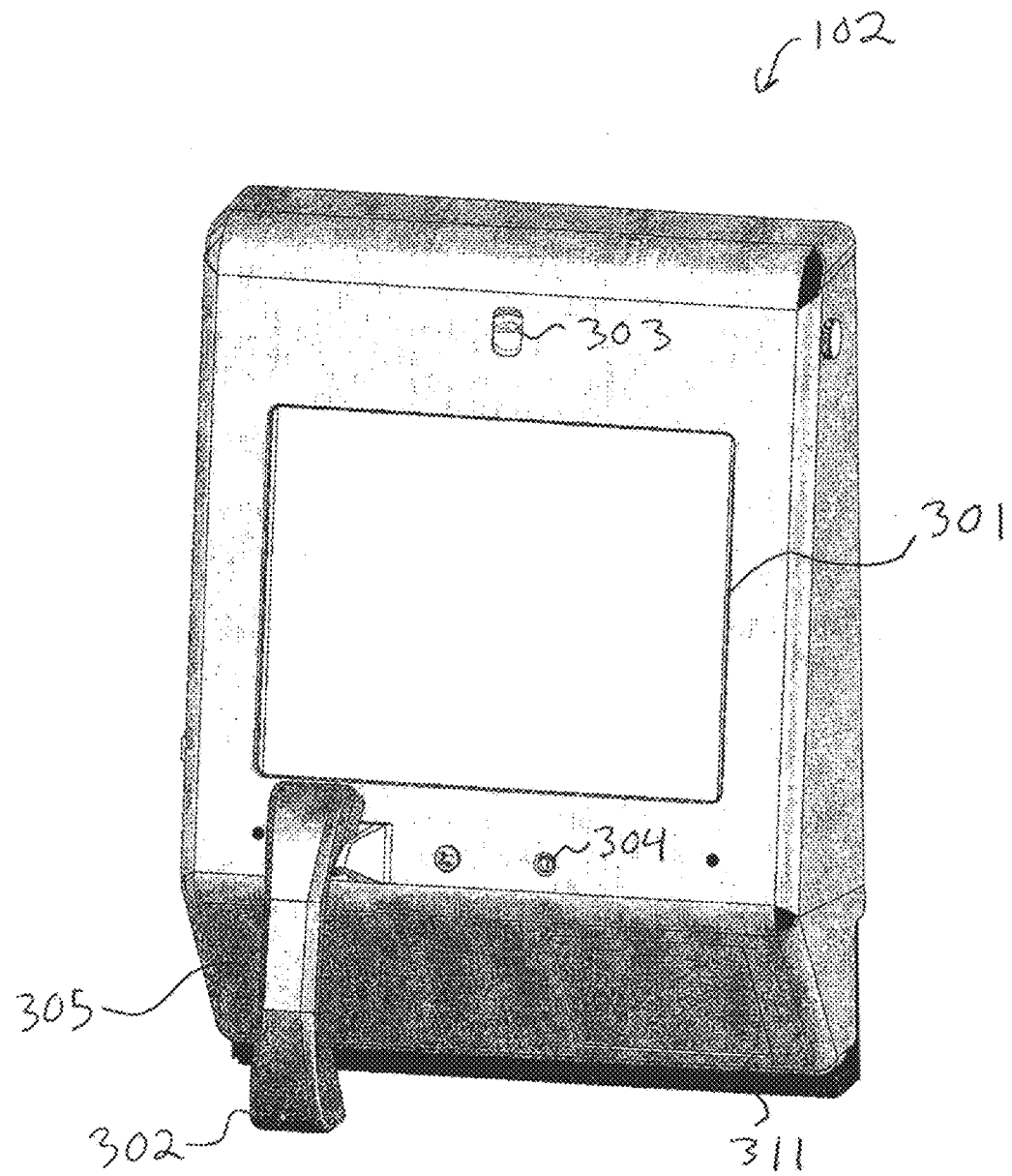
FIG. 3 illustrates an example kiosk for use in the interactive audio/video platform.

FIG. 3 illustrates an example kiosk 102 used in an embodiment of the interactive audio/video platform. The kiosk 102 includes an integrated camera 303 that can be used for video communications or for user authentication via facial recognition. The kiosk 102 also includes a touch screen 301 that displays images and can detect the presence and location of a user's touch within the display area. The touch screen 301, may be, for example, a 15 inch capacitive or resistive touch screen display. The touch screen 301 serves as the main kiosk interface with a user. A telephone handset 302 connected to the kiosk 102 includes a speaker and a microphone. The telephone handset 302 can be used to issue voice commands and provide voice authentication as required, or it can be used for voice and video communications, among other things. The telephone handset 302 is optional, as a kiosk user may instead plug in a headphones or headphones with an in-line microphone using one or more stereo headphone jacks 304. Stereo headphone jacks 304 can also be located on the side of the kiosk 102 or behind a movable panel 311, which can be locked in a position exposing the jacks 304, or in a position blocking them, depending on the preferences of the facility. A USB interface optionally located behind the movable panel 311 can be used for system diagnostics by technicians or to synchronize files to an external device, such as a portable media player. The kiosk 102 also includes a speaker 305 that provides audio output.

While FIG. 3 illustrates a kiosk that is a wall-mountable kiosk, other structural forms, enclosures, or designs are possible. The kiosk 102 may be any shape or size suitable to providing the described components and services. The kiosk 102 may be, for example, a standalone structure, a personal computer, a laptop, a mobile device, or a tablet computer device. If the kiosk 102 is in the form of a laptop, mobile device, or tablet computer, it may be a ruggedized device designed to withstand physical shock, and may be integrated with a docking system that connects to the device for locking, storage, display, additional connectivity and/or charging. The kiosk 102 may be tethered to a structure by known methods, such as a security lock cable.

Figure 4:
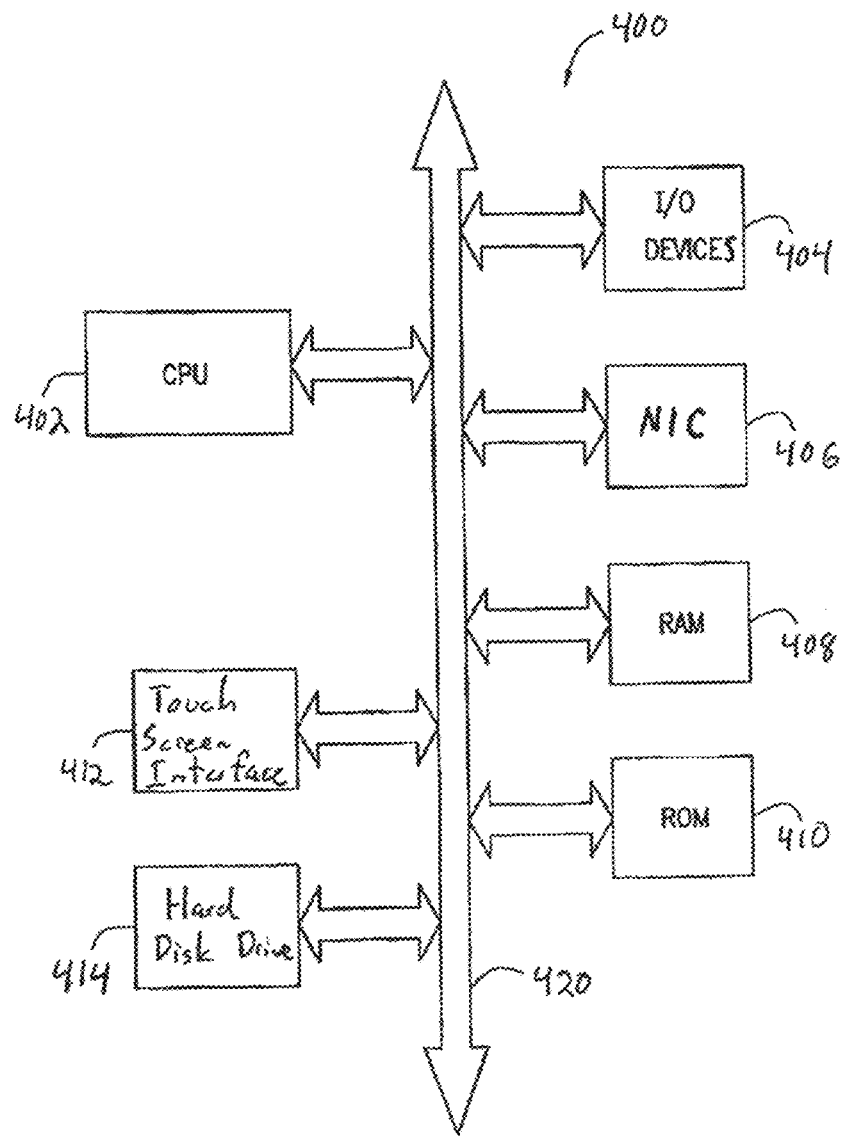
FIG. 4 illustrates an example processor-based computer system of the kiosk.

Internally, the kiosk 102 includes a processor-based computer system 400, such as the one illustrated in the FIG. 4 block diagram. The processor-based system 400 may be a computer system or any other processor system, including computer systems designed for use in mobile devices or tablet computers. The system 400 includes one or more central processing units (CPUs) 402, that communicate with random access memory (RAM) 408, read-only memory (ROM) 410, a hard disk drive 414, a network interface controller (NIC) 406, a touch screen interface 412, and other Input/output (I/O) devices 404 over a bus 420. It should be noted that the bus 420 may be a series of buses and bridges commonly used in a processor-based system, but for convenience purposes only, the bus 420 has been illustrated as a single bus. I/O devices 404 may include features described above in reference to FIG. 3 including the telephone handset 302, the camera 303, or the headphone jacks 304 and may also be connected to the bus 420. The processor-based system 400 also includes ROM 410, which may be used to store a software program. Portions of the software program may also be stored on the hard disk drive 414, and the software program may write and read data such as logs to and from the hard disk drive 414. A NIC 406 may handle incoming and outgoing network communications, such as IP communications via Ethernet.

The hard disk drive 414 of the kiosk 102 may be optional, as the device may be configured to utilize network storage instead. When configured to utilize network storage, the kiosk 102, upon being powered on, may search the network (which may be a local network) for a server (which may be a local server) to locate a boot image. When a boot image is located, the device may download and run the boot image (a "netboot"). When the device is in this mode, all temporary information after booting may be stored in the local memory of the device (RAM 408). Important information, such as logs of user activities, is sent directly to a server (local or remote) for permanent storage.

The kiosks 102 may be configured to communicate directly with servers at the processing centers 150, 250 (illustrated in FIGS. 1 and 2), or they may be networked to communicate with a local server computer at the facility 100 that coordinates communication with servers at the processing centers 150, 250. In another configuration, they may communicate with a server at a location remote to both the facility 100 and the processing centers 150, 250. The processor-based computer system 400 may run an operating system such as the Linux operating system, or may be configured with a custom operating system. Although the FIG. 4 block diagram depicts only one CPU 402, the FIG. 4 system could also be configured as a parallel processor machine for performing parallel processing.

Figure 5:
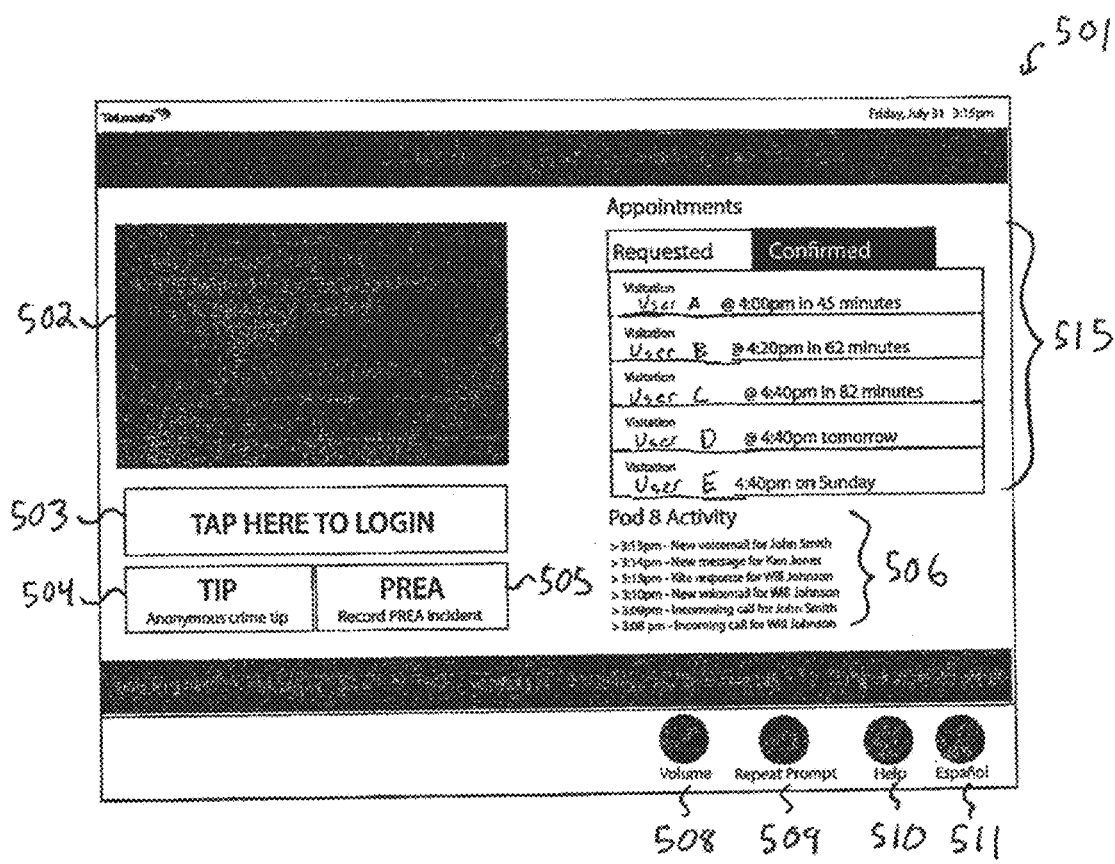
FIG. 5 illustrates an example idle screen of a kiosk interface described herein.

FIG. 5 illustrates an example idle screen 501 of the kiosk interface (i.e., touch screen 301). The idle screen 501 is displayed when no resident has logged on or reserved the system for use. The kiosk interface may display a video 502 of a handset being lifted, a finger touching the screen, and a headset being plugged into the audio jacks, which instructs the resident how to interact with the kiosk 102. The video 502 may also display advertisements or other facility messages.

Three primary interaction options are presented on the idle screen 501. First, a resident can select the login icon 503 to log in to the system. The login procedure is described in more detail below in reference to FIG. 7. Second, a resident can select the tip icon 504 to submit an anonymous crime tip without logging in. Once this icon 504 is selected, the resident is presented with the ability to type or record a crime tip that is forwarded to the appropriate authorities. Third, a resident can select the PREA icon 505, which is used to report an incident under the Prison Rape Elimination Act (PREA). As with crime tips, these incident reports are prepared anonymously and forwarded to the appropriate authorities. Accordingly, the resident is not required to log in for some functionality.

The idle screen 501 also displays an appointments schedule 515, which shows reservations of the kiosk 102. Facility residents are able to use the kiosk 102 to reserve use of the kiosks at certain times, as is discussed in more detail below. The appointments schedule 515 shows when this particular kiosk 102 is reserved. The "Requested" tab shows requests submitted by inmates, and the "Confirmed" tab shows reservations that have been confirmed by the appropriate administrative staff. Requested reservations may be transmitted to administrative staff, enabling staff to view and approve the reservations using a web interface. Alternatively, the approval of reservations can be automated, so that each resident is permitted to make a certain number of reservations within a predefined time period. The activity display 506 shows recent activity for a particular kiosk 102 or group of kiosks 102.

Other features on the idle screen 501 include a scroll that can display various facility messages, such as facility bulletins, set by an administrator. The scroll can also be used to display advertisements or information about features of the kiosk 102. Icons 508-511 at the bottom of the display are persistent icons that are displayed on most or all screens of the kiosk interface. A resident can select the volume icon 508 to change the volume of the speakers, headphones, or handset. Selecting the repeat prompt icon 509 causes the system to replay the last voice prompt. The help icon 510 takes a resident to a help menu, which may include interactive help with audio and video instructions. The language icon 511 changes the language of the text displayed on the kiosk 102. In the illustrated example, the language icon 511 can be selected to switch the language to Spanish, but the language icon 511 may allow switching between additional languages such as French or Russian.

Figure 6:
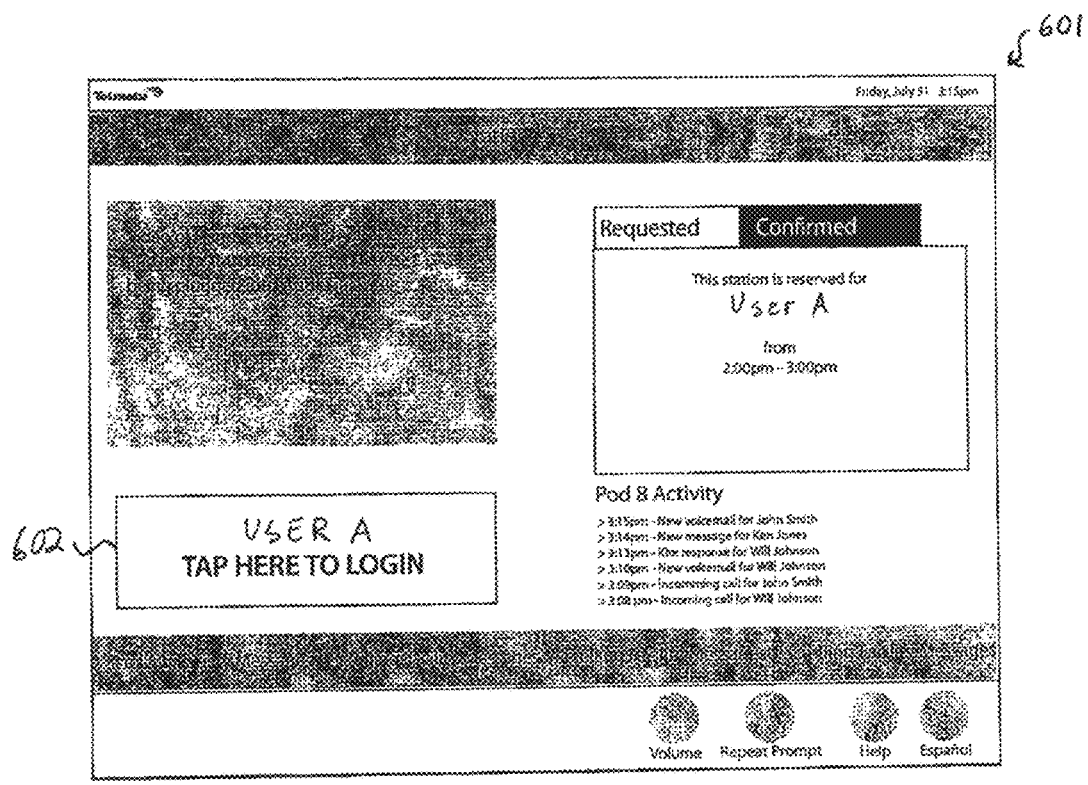
FIG. 6 illustrates an example reservation screen of the kiosk interface.

When a kiosk 102 has been reserved, a reservation screen 601 is displayed on the kiosk interface, as illustrated in FIG. 6. In the illustrated example, the resident's name is displayed in an icon 602, which instructs the resident to log on. When a kiosk 102 has been reserved, only the resident with the reservation can log on. If another user is already accessing the system when there is an upcoming reservation, the current user is warned of the upcoming reservation via messages displayed on the kiosk 102. Warnings can be displayed in several intervals, for example 5 minutes, 1 minutes, and 20 seconds prior to a scheduled appointment time. Once the scheduled time arrives, the current user is automatically logged off of the device.

Figure 7:
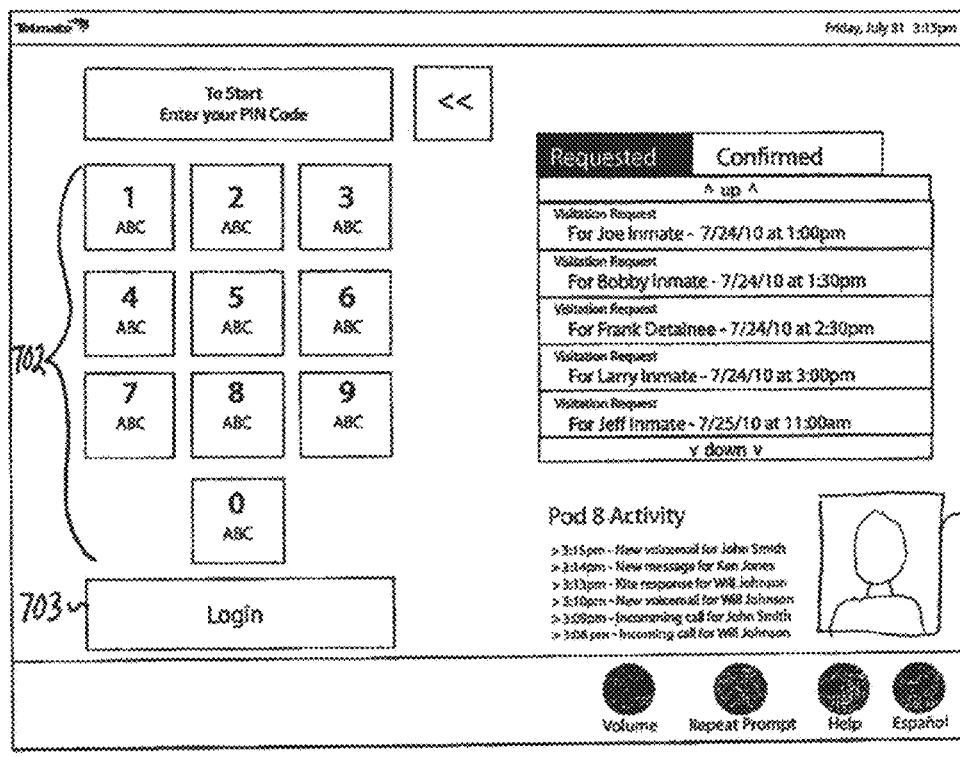
FIG. 7 illustrates an example login screen of the kiosk interface.

FIG. 7 illustrates a login screen 701 of the kiosk interface. At the login screen 701, a resident is requested to enter a personal identification number (PIN) using a virtual key pad 702 and login icon 703 to log in to the kiosk 102. Each resident at a facility is given a unique personal identification number to ensure security. During the log in process, the camera of the kiosk 102 is activated. An image or video of the resident logging on is recorded, and stored along with a record of the attempted log in. Administrators can later view images or video of these log in attempts. In addition, the kiosk 102 will use facial detection software to ensure that a face is present in the camera field of view. If no face is present (for example, because a resident is blocking the camera with their hand or other obstruction), the system will not permit a log in to be completed. During a resident's log in, the kiosk 102 may display a video feed 705 on the login screen 701, providing a visual reminder to the resident that the images are being recorded. Additional secondary verification systems (such as voice biometrics and individualized facial recognition) may also be utilized, as illustrated in FIGS. 7-8.

Figure 8:
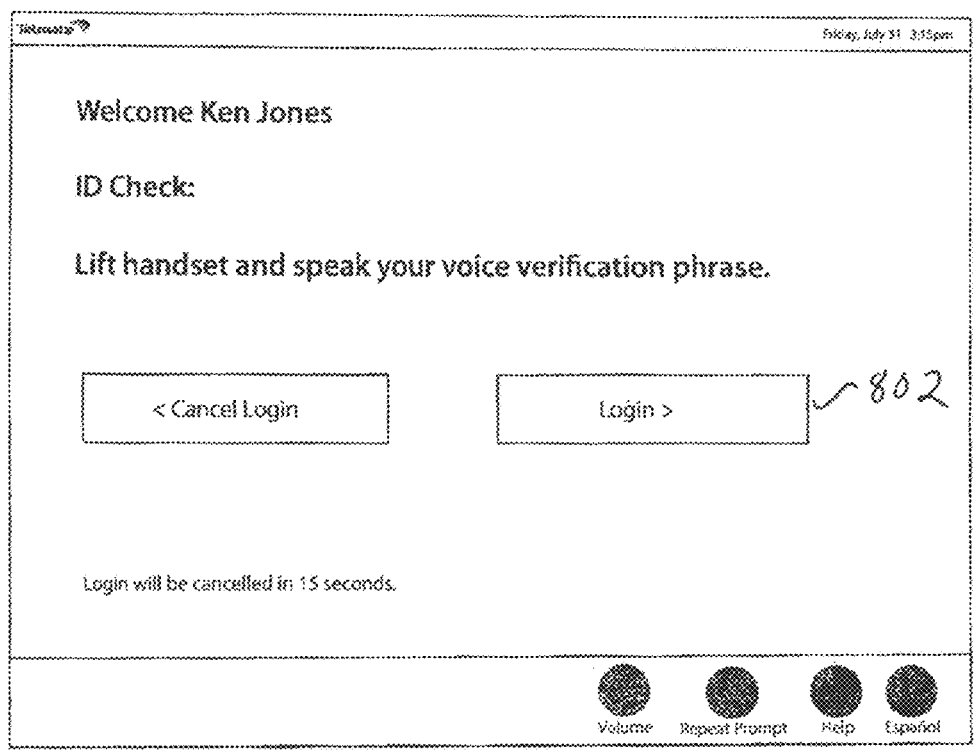
FIG. 8 illustrates an example voice verification screen of the kiosk interface.

FIG. 8 illustrates a voice verification screen 801 of the kiosk interface. The voice verification system utilizes a voice ID audio clip that was previously recorded by the facility resident. The pre-recorded clip can be recorded under the supervision of facility administrative staff, and may be, for example, a recording of a resident stating their name or another short phrase. At the voice verification screen 801, the facility resident is requested to lift the telephone handset and speak the pre-recorded phrase. After speaking the phrase, the resident selects the login icon 802 to log into the system. The voice verification system records the phrase spoken by the facility resident, and compares a digital signature of the audio to the pre-recorded audio clip. The pre-recorded clips may be created and stored locally at the kiosk 102 (not shown) or may be created by another mechanism and stored at a database 258 of the processing center 250 (as illustrated in FIG. 2). Accordingly, the comparison may be made by software on the kiosk 102 or at the processing center 250. If the recorded audio matches the pre-recorded audio clip, the resident is granted access.

Figure 9:
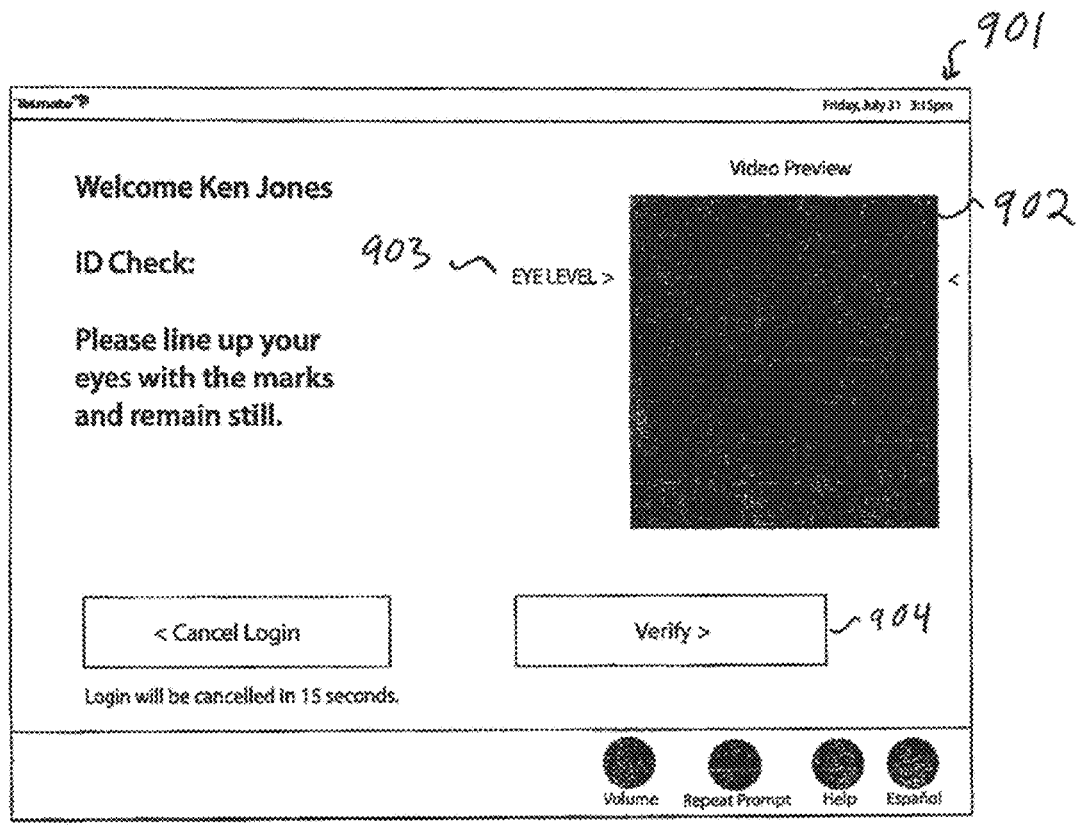
FIG. 9 illustrates an example facial recognition verification screen of the kiosk interface.

FIG. 9 illustrates a facial recognition verification screen 901 of the kiosk interface. Facial recognition verification may be used in combination with one or more of the other verification systems, including the PIN verification and the voice verification. On the facial recognition verification screen 901, the video preview window 902 displays the field of view of the camera. The display requests that the resident line up their eyes with the eye level marks 903 displayed next to the video preview window 902. This ensures that an appropriate image is captured for verification. When the resident selects the verify icon 904, facial verification is performed.

As with the voice verification system, the facial verification processing may be performed locally at the kiosk 102 or may be performed at the processing center 150. In either case, the facial verification processing includes comparing an image captured by the camera 303 of the kiosk 102 with a pre-stored image of the resident. The facial recognition system uses facial "landmarks" generated by mathematical formulas to present a score which indicates a likelihood that the captured image matches the pre-stored image. If the images match to a sufficient degree, the verification is approved and the resident is granted access to the system. If the images do not match, the system may store the captured image and other usage details for review by administration officials.

Figure 10:
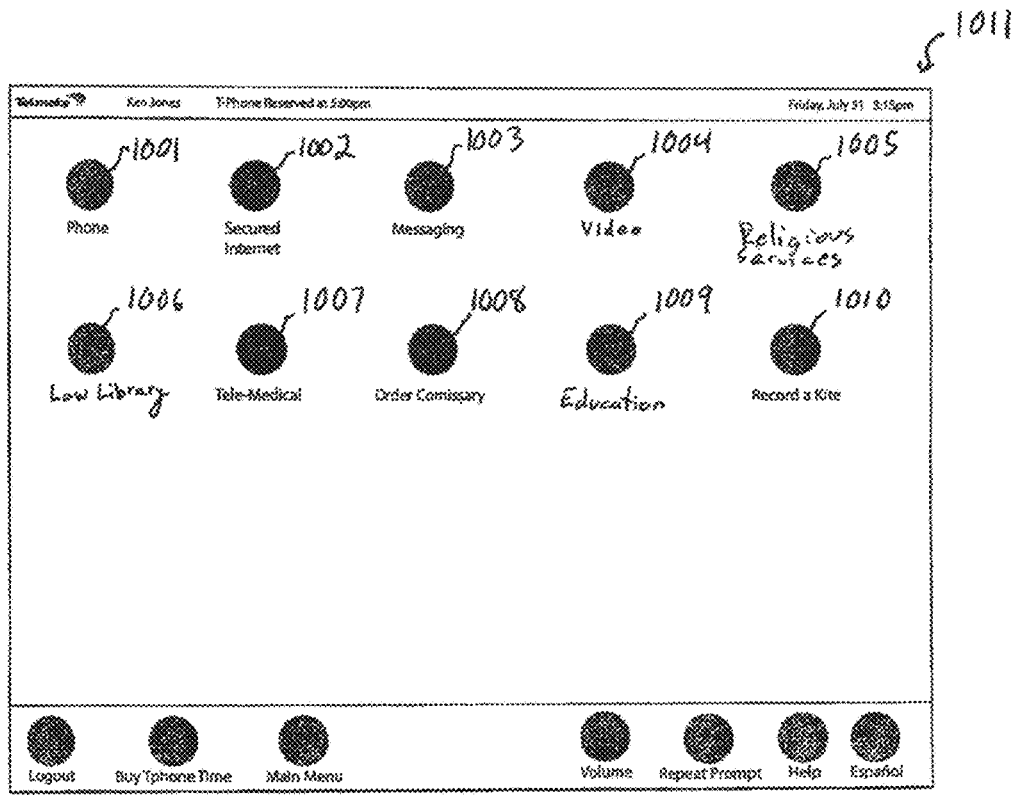
FIG. 10 illustrates an example main screen of the kiosk interface.

Once a resident has logged into the system, they are presented with a main screen 1011 of the kiosk interface, illustrated in FIG. 10. From this screen, a resident can access all other features of the kiosk 102. Features can include phone calling, internet access, text messaging, video conferencing and messaging, religious services, law library access, tele-medical sessions, commissary ordering, educational materials, Kite recording, and access to other facility services. As such, the screen 1011 can have a phone icon 1001, an internet icon 1002, a messaging icon 1003, a video icon 1004, a religious services icon 1005, a law library icon 1006, a tele-medical icon 1007, a commissary icon 1008, an education icon 1009, and a kite icon 1010. The icons in FIG. 10 are a sampling of possible features, but other icons may be provided for additional features. The options available at the main screen 1011 can be configured by facility administrators, and each resident can be configured with a unique profile limiting the available options to some sub-set of all of the options. Accordingly, certain restrictions can be placed on individual residents of the facility due to misuse of the system or for other reasons.

Communications features are central to the kiosk functionality. Residents can communicate via voice, video, or text messaging. To initiate a voice communication, a resident can select the phone icon 1001 from the main screen 1011. The resident is then presented with a phone screen 1111, such as the one illustrated in FIG. 11. Depending on the configuration preferred by a facility, additional authentication may be performed prior to the voice communication (voice authentication, facial recognition authentication, or other forms of authentication).

Figure 11:
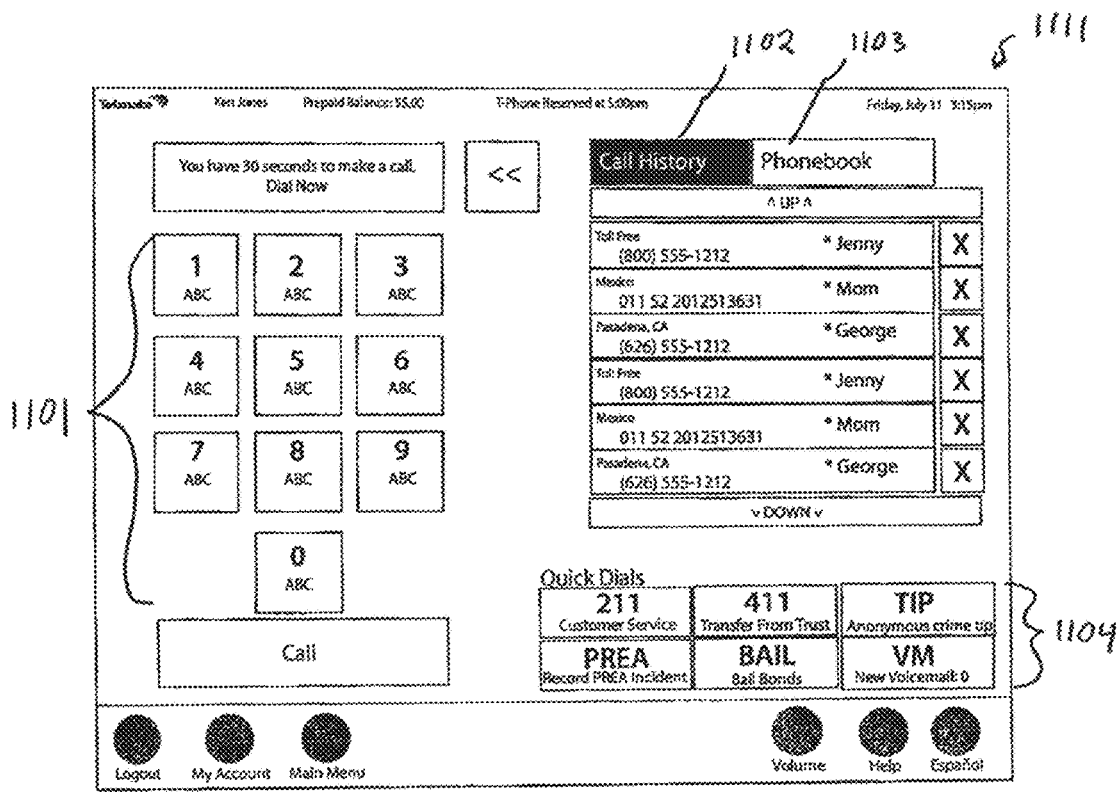
FIG. 11 illustrates an example phone screen of the kiosk interface.

As shown in FIG. 11, at the phone screen 1111 a resident is presented with a virtual key pad 1101 that can be used to dial a telephone number. The resident can also select a number using the call history 1102 or phonebook features 1103. The call history 1102 is automatically constructed from a resident's history of incoming and/or outgoing calls. The phonebook can be edited by the resident. Quick dials 1104 are presented for frequently used administrative numbers such as customer service, funds transfer, anonymous crime tip, PREA reporting, bail bonds, or voicemail. A resident's call is routed (e.g., via the internet) to a processing center such as processing centers 150, 250 illustrated in FIGS. 1 and 2. Processing at the processing centers determines whether the resident has permission to make calls to the dialed party and whether the resident has sufficient funds, and either allows or denies the call. The processing center 150, 250 can also log and record the call, as appropriate. If the call is approved, it is processed according to the descriptions above in reference to FIGS. 1 and 2.

Figure 12:
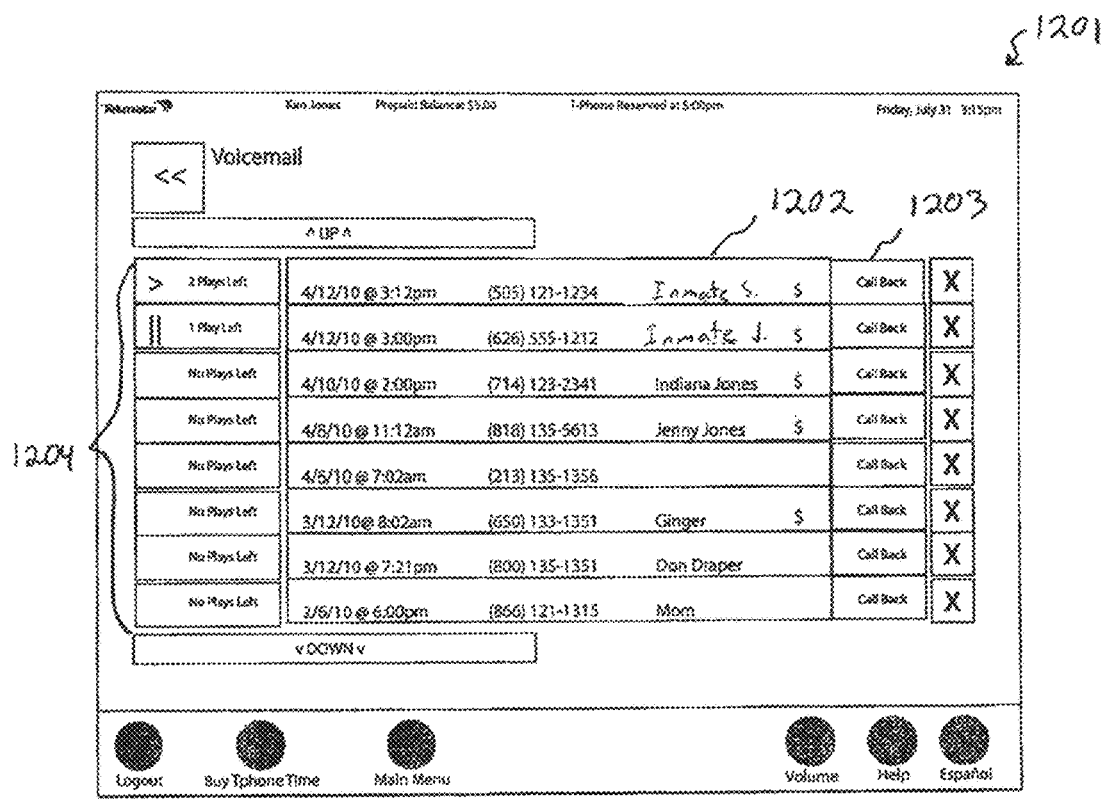
FIG. 12 illustrates an example voicemail screen of the kiosk interface.

From the phone screen 1111, a resident can access voicemail using the quick dial icon 1104. FIG. 12 illustrates an example voicemail screen 1201. As shown in FIG. 12, voicemail messages can be displayed visually in a list 1202. The voicemail can be stored locally on the kiosk 102 or may be stored at a processing center (such as processing centers 150, 250 illustrated in FIGS. 1 and 2). The resident may be permitted only a limited number of playbacks of voicemail recordings, indicated by icons 1204 displaying a number of remaining playbacks. Limits on playbacks may be optionally removed, depending on the desires of a particular facility. Optionally, the kiosk 102 may be configured so that a voicemail may be played more than a predetermined number of times only after a fee is paid. The call back icon 1203 allows the resident to return the call of the individual displayed on the list 1202. Voicemail messages are stored permanently on the server of the processing center, so that administrative staff always has an archive of voicemails received by the residents.

Figure 13:
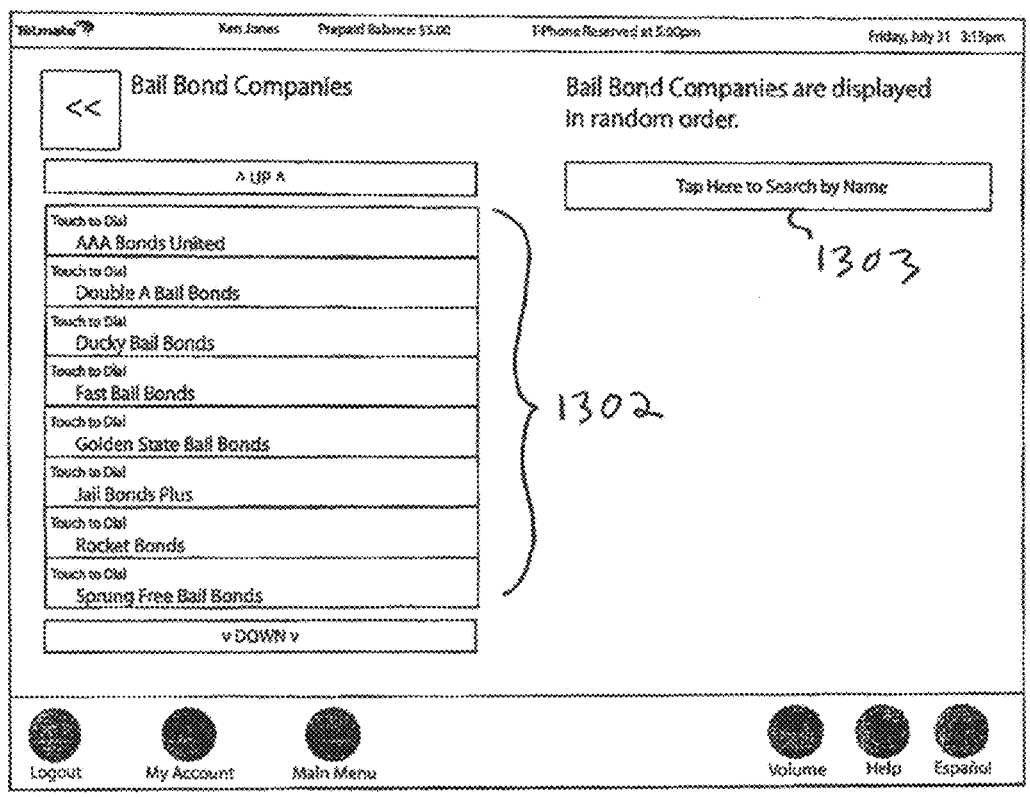
FIG. 13 illustrates an example bail bonds screen of the kiosk interface.

A resident may also access a bail bonds screen 1301 from the phone screen 1111. The bail bonds screen 1301 is displayed in FIG. 13. As shown in FIG. 13, available bail bond companies may be displayed in a random order in a list 1302. It should be appreciated that the companies can be listed in alphabetical or other orders too. The resident may select from this list or may select the search icon 1303 to search for a bail bond company by name. If the search icon 1303 is selected, the resident can enter the name of a bail bond company using an on-screen keyboard, and a database of known bail bond companies will be searched.

The kiosk 102 also enables incoming calls. An outside caller, such as parties 180, 181, 280 in FIGS. 1 and 2, can dial a number assigned to one or more facilities and, using an IVR with dial-by-name functionality, locate the inmate they wish to call. Alternatively, the resident may have a personalized number assigned, for an additional fee. If the resident has permission to receive incoming calls from the calling party, and if the resident or the outside caller has sufficient funds in their account, then kiosks 102 that are identified as being located in the area that the resident is housed in will play an alert tone. Optionally, the schedule of the resident can be stored in the system and different kiosks 102 may be activated according to the predicted location of a resident based on the schedule. When there is an incoming call, the kiosk 102 would display the resident's name, and optionally, a caller ID for the incoming call. The kiosk 102 may also audibly announce the incoming call and the name of the receiving party (this may be enabled or disabled on a per-facility basis).

To answer the call, the resident would need to log into a kiosk 102 using the login procedure described above. Only the resident associated with the called number will be permitted to answer the call. During the resident's log in, a voice message can be played to the outside caller, so that they are informed that the resident is in the processing of logging in. If a resident does not log in after a predetermined period of time, the caller is prompted to leave a voicemail message.

When there are multiple incoming calls received simultaneously, the kiosk 102 will announce the names of the multiple calling parties. The login screen would display the names of the calling parties or the called parties, and the resident would select the appropriate name from the screen and then proceed to the login procedure.

The incoming call can also be a video call. In this case, the caller would log into an internet website providing a video conferencing interface (described in more detail below). As with voice calls, an alert tone would be played by one or more kiosks 102 in the vicinity of the resident, and the resident would be prompted to log in to receive the video call.

Using the kiosk 102 for telephone communications has significant advantages over ordinary telephone systems. The touch screen of the kiosk 102 can display extra information, such as caller ID, available funds, time left on a call, or help options. The touch screen can also display advertisements or facility messages during the call. Additionally, through integration with the processing centers 150, 250, additional security, logging, monitoring, and recording functionality is enabled.

The kiosk 102 also provides secure text-based messaging between residents of the facility and the public. A resident can access text-based messaging functionality by selecting the messaging icon 1003 from the main screen 1011 illustrated in FIG. 10. On the messaging screen (not shown), the resident can select to retrieve received messages or to compose and send a new message. To send a new message, the resident types a recipient name or selects a name from an address book similar to how text messaging is done on cellular phones, smart phones, and PDAs. An on-screen keyboard allows the resident to type a message. Residents can be charged per-message or by alphanumeric character, as desired by the facility.

Messages sent by residents are transmitted to a processing center (such as processing centers 150, 250 of FIGS. 1 and 2) where they are stored. The processing center sends an email or SMS message to a pre-registered email address or cellular phone number of the recipient, notifying that they have an available message. Optionally, messages may include photo or video attachments taken with the kiosk camera. Attachment functionality may be enabled or disabled based on facility preference. The message itself is not displayed in the email or SMS message, the message is only available for viewing when the outside user logs into a secure website. This ensures secure delivery of the message. For additional security, the messaging functionality may be set so that messages viewed on the website cannot be forwarded or copied from the secure website. This provides the facility with an additional level of control over the messages. Thus, while the system resembles email, the messages are not accessible via email, and can not be copied or forwarded like email.

All messages transmitted via the system may be logged at the processing centers 150, 250 (as illustrated in FIGS. 1 and 2). Even messages that are deleted by a resident our outside party can be stored for audit and investigative purposes. Additionally, messaging may be restricted on a per-resident or group basis: prohibiting particular inmates from sending or receiving messages to all, or just some, persons, as well as prohibiting some outside parties from messaging specific inmates. An outside party may need to have an account with the system, and may need to have proper funds or credits in the account and pass an ID verification check, which may include the verification methods above (PIN number, voice identification and/or facial recognition).

Figure 14:
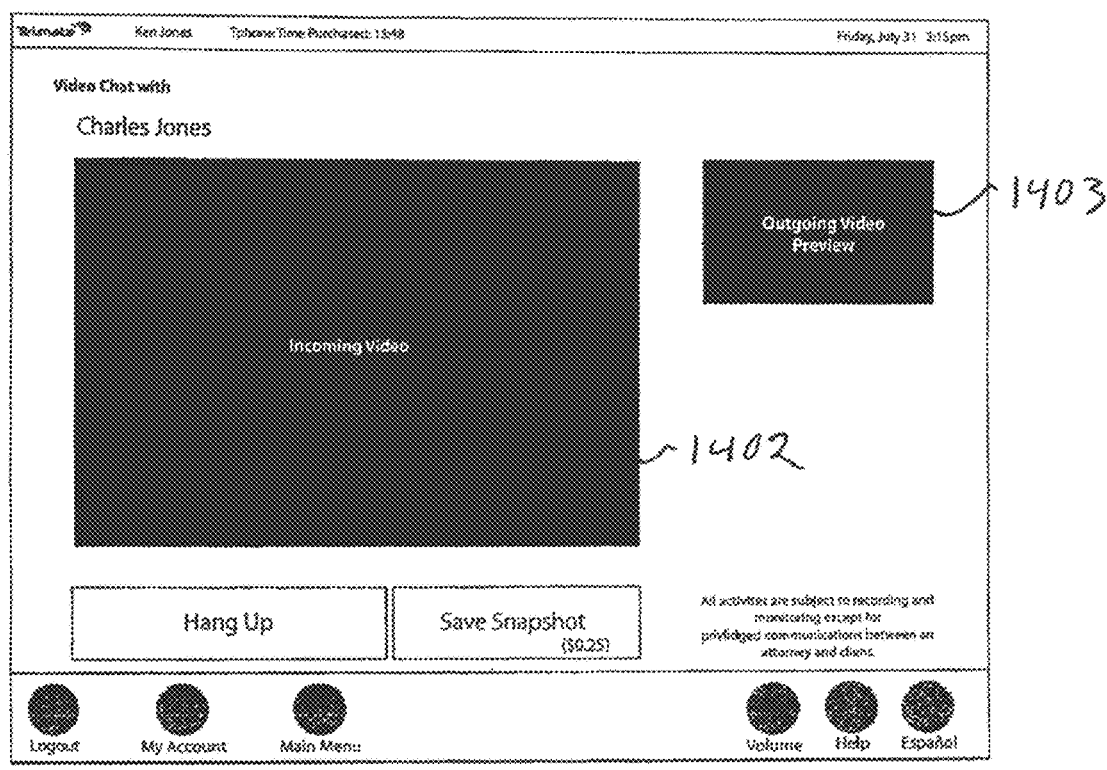
FIG. 14 illustrates an example video conferencing screen of the kiosk interface.

The kiosk 103 also provides secure video conferencing and video messaging. A resident can access video conferencing functionality by selecting the video icon 1004 from the main screen 1011 illustrated in FIG. 10. FIG. 14 illustrates an example of a video conferencing screen 1401. Incoming video is displayed in a video window 1402, and a resident can view outgoing video in a smaller window 1403. The video conferencing feature may also allow residents to save a snapshot of the incoming video. The snapshots may incur an additional charge to the resident's account.

Full motion color video conferencing can be provided between a resident in a secure facility and either (a) a remote party connected over the internet with a standard internet browser or (b) a party at another kiosk 102 located in the same or at another facility. For example, kiosks 102 may be located in a visitor's area of a facility.

An outside party can connect to an internet website that provides video conferencing with a facility and log in with a pre-registered account or create a new account. The outside party may need to have an account with the system, and may need to have proper funds or credits in the account and pass an ID verification check, which may include the verification methods described above (PIN number, voice identification and/or facial recognition). The remote party can add funds to his/her account to cover the cost of video conferencing, which may be charged on a per-session or per-minute basis, as set by the facility. From the website, the outside party can either schedule a call or connect to a pre-scheduled call. The outside party can also attempt a live call to the facility (as described above). To participate in the video conference, the outside party may need a computer with an internet connection, a web camera, a microphone, and speakers (or headset).

An outside party can also use another kiosk 102 located in the same facility. As with the internet website, the outside party may log into a visitation kiosk 102 and may add funds to an account to cover the cost of video conferencing (as mentioned above, a resident may also be allotted a certain amount of free visitation time). The outside party can either schedule a call or connect to a pre-scheduled call. It is also possible to route communications from one facility to another, so that a party at a first facility can communicate with a resident in another. When two kiosks 102 in the same facility are used for a video conference, the video may be transmitted through a local media server at the facility, instead of being routed through servers at a processing center 150, 250 as illustrated in FIGS. 1 and 2.

Facial detection software is utilized to provide additional security and to monitor use of the video conferencing feature. The facial detection software may be executed locally on the kiosk 102, or may be executed at processing centers that are routing the communications. The facial detection software uses video analysis of individual frames of video to detect that a human face is present inside the video frame. If a face is not detected, the system blurs or otherwise obscures the image. This prevents inappropriate images from being transmitted.

The facial detection software may also periodically pass images to a facial verification system. The facial verification system compares a detected face image with a face image stored in a database. If the detected image does not match the pre-stored image, a warning is displayed to prompt the resident to face the camera so that a second image can be captured. If the second image does not match or a face is not detected, the account will be logged off the system. This can be logged as a violation at the processing center. The facial verification ensures that the logged-in resident has not allowed another resident to use the account after logging in. The facial detection software may also detect when a second face is present in the frame, and may blur or disconnect a conference when a second face is present.

The facial verification feature can be active even when the resident (and/or a user outside of the detention environment) is not intentionally using the camera, such as when the resident is using entertainment or text messaging features. Images taken periodically and compared against pre-stored images ensure that only authorized residents are accessing system features. Facial verification may also be used on video being captured by an outside user during a video conference or video message. Outside parties that wish to use the video conferencing features may be required to register a facial image with their account. This ensures that only authorized individuals are communicating with a resident during a conference.

Figure 15:
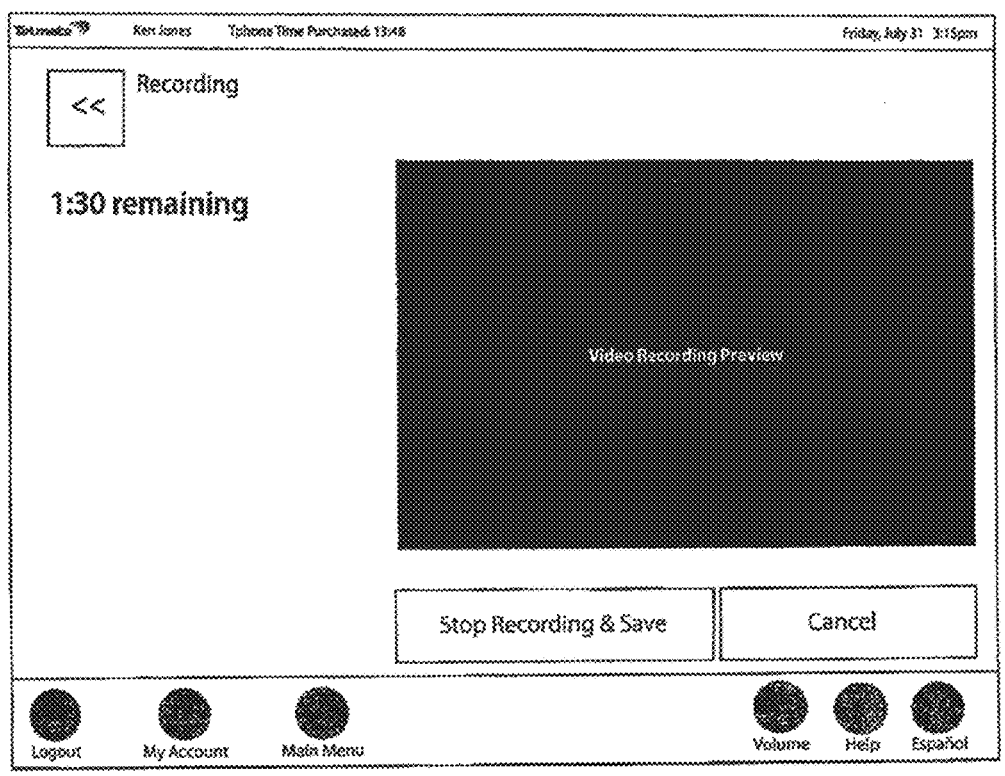
FIG. 15 illustrates an example video messaging screen of the kiosk interface.

Video messaging allows a resident and outside party to send video messages to one another using the kiosk 102, in a similar manner to the text-based messaging described above. An example video messaging screen 1501 is illustrated in FIG. 15. An outside party receiving a video message would receive an SMS or email message alerting them to the availability of the video message. As with the text-based messaging, the outside party would log into a secure website to view the message. Video messages can be charged on a per-message or per-minute basis.

Another option available from the main screen 1011 of the kiosk 102 (illustrated in FIG. 10) is a tele-medical session 1007. This feature allows residents to participate in a video conference with a medical professional or record video that can used to pre-screen patients before they are allowed to schedule an appointment with a doctor. All video can be logged to allow facility staff to review and follow up on any potential medical situations. Optionally, the facial detection features described above may be disabled for tele-medical sessions.

By selecting the religious services icon 1005 of the main screen 1011 (illustrated in FIG. 10), a resident can access video and audio recordings of religious services. The resident can also access religious texts. The law library icon 1006 (illustrated in FIG. 10) provides access to electronic versions of law books and statutes in a searchable format. Locally-relevant law books may be provided (e.g., the laws for the state the facility is located in). Law libraries may be stored on servers at the processing center, or may be accessed via publicly available websites.

Selecting the education icon 1009 of the main screen 1011 (illustrated in FIG. 10) provides a resident with access to various educational material. Facility rules and procedures are presented for text-based browsing. These can include handbook material covering facility rules, procedures, and other information. The educational function may also provide access to facility orientation videos that explain facility operations, rules, and procedures. Access to this section can be made available without charge, but with limited viewing time to avoid monopolizing the kiosk 102. Distance learning programs may also be offered as video and text coursework, for free or based on a charge, depending on facility rules.

Selecting the commissary icon 1008 (illustrated in FIG. 10) from the main screen 1011 allows a resident to place orders from a facility commissary by browsing a collection of items and making selections. The resident can purchase items using a shopping cart metaphor as implemented on internet shopping websites. The resident must have available funds in their account to purchase items from the commissary. Time spent browsing the commissary can be limited to a predetermined number of minutes per day, so that the function can be provided free of charge while not monopolizing the kiosk 102.

Selecting the Kite icon 1010 provided on the main screen 1011 (illustrated in FIG. 10) allows a resident to prepare Kite messages. Kites are a form of written communications in jails, and typically include requests for medical treatment, complaints or concerns about housing, commissary, food, and the facility itself. The Kite menu is available to all residents, and does not require funds to access. Kites are recorded using video from the camera 303, and audio from the telephone handset 302 of the kiosk 102. The resident stands in front of the device and records their request verbally, and video (with audio) of the kite requests is recorded. When recording a video, the kiosk 102 will indicate when the video is starting and will display a preview window during the recording.

Figure 16:
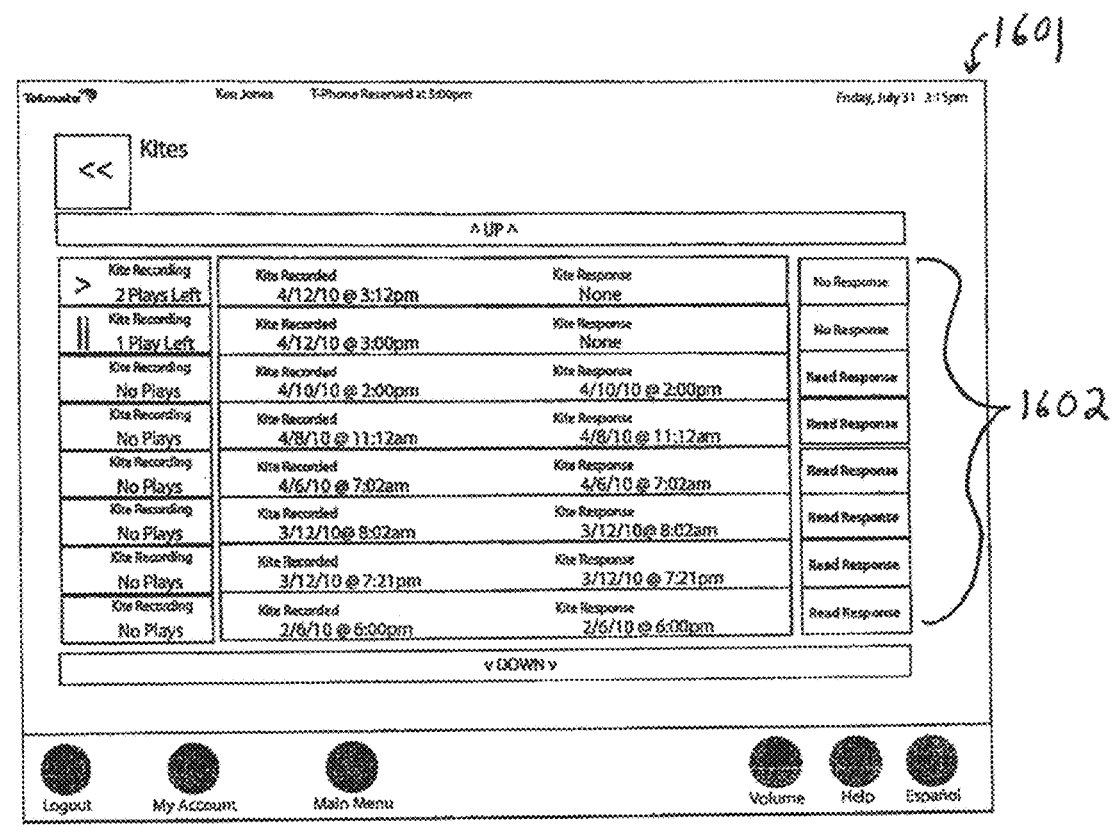

The resident can use the kiosk 102 to receive a history of all of their Kite requests and their current status, as illustrated on the example Kite screen 1601 illustrated in FIG. 16. A resident can click the read response icons 1602 to read responses to past kite requests. When the resident submits a new Kite, the video message becomes available for review by facility staff using the web interface of the central platform. Kite messages are presented to administrators as a queue of video messages to view and respond to. A text-based response can be prepared for viewing on the kiosk 102 by the resident. Any action undertaken in connection to the Kite (viewing, responding, changing status, etc.) can be logged in a Kite audit trail and can be reviewed by facility administrative staff.

Figure 17:
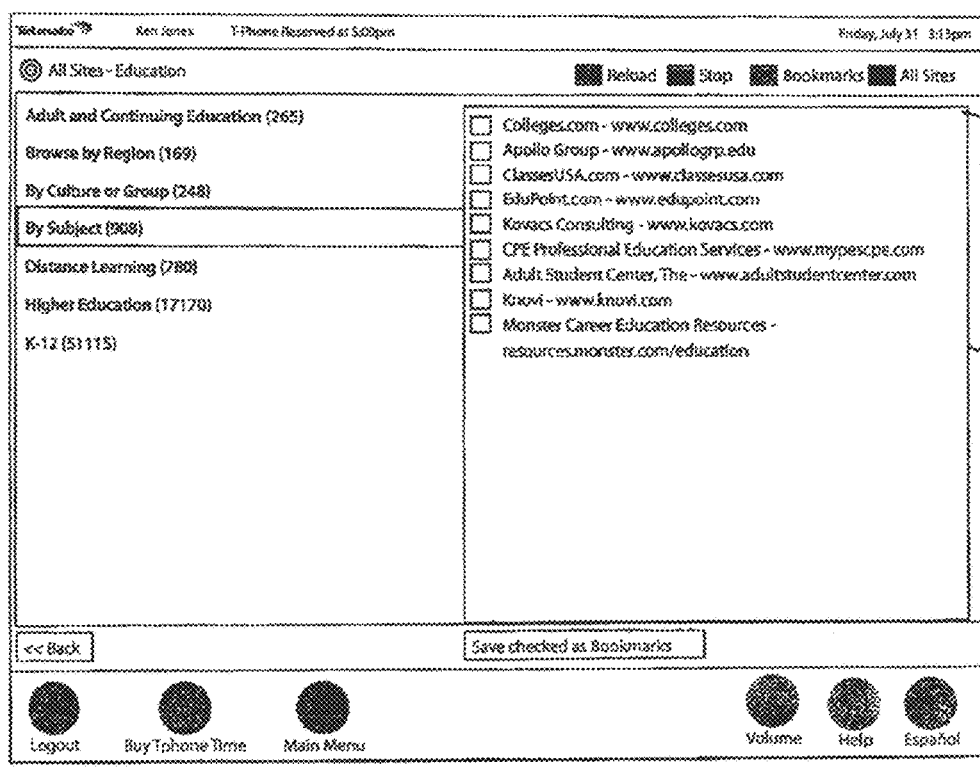
FIG. 17 illustrates an example internet screen of the kiosk interface.

The internet icon 1002 on the main screen 1011 (illustrated in FIG. 10) provides access to information on internet web sites. All traffic through the internet browser is routed through a proxy server hosted at the processing center or locally at the facility. The proxy server can block any site that is not on a pre-approved list of websites. The default behavior is to block access to a website, and only a site added to a whitelist are reachable. To facilitate browsing of approved sites, the resident may be presented with a list of categories and pre-approved sites. By selecting a category, the resident is presented with a list of sites in that category. FIG. 17 provides an example of an Internet screen 1701 showing available websites 1702 in an Education Category 1703. Category 1703 shows certain categories (e.g., Adult and Continuing Education) but is not so limited. Any category approved by the facility can be displayed. The Internet browser can provide access to the full text of books in the public domain and made available through public websites. Streaming television may be accessed through pre-approved sites.

One method of text input for the internet feature is via an on-screen keyboard on the kiosk display. The keyboard may be enabled/disabled on a per site basis. This can be used to prevent residents from entering comments or messages on sites where they can not be monitored. For example, a resident may be permitted to view stories on a news site, but not permitted to enter comments onto the site.

For additional security, the resident may be blocked from entering their own internet address, and the only method of browsing may be the selection of pre-approved sites. The proxy server can be configured prevent a resident from obtaining content from a site that is not on a pre-approved domain.

All actions taken on a kiosk 102 may be logged and recorded in the resident's records that are stored at the processing center. Examples of information logged in an audit trail include each session start, location of the session (e.g., kiosk number), length, and audio or video recordings of activities. The system can also log phone calls placed, including call destination, length, billing method, and a recording of the audio. Video conferences can also be recorded (at both sides of the conference), and the time, length, and billing method are logged. Text messages sent and received can be stored, along with message text, time, and destination. The log can contain a list of every internet site and visited, at what time, and for how long. All visitations attended, requested, or denied, and all interactions with outside parties can also be logged. All applications and services accessed can be logged, including the time started and the length used. As with the other features, the logging capabilities can be configured on a per-facility basis, allowing each facility to customize the level of reporting and monitoring, as appropriate. Administrators can access logs or configuration settings using a web interface provided by the processing center 150, 250 (illustrated in FIGS. 1 and 2).

All recorded communications may be logged and made available for review by administrative staff. Recordings (e.g., audio, video, and text, etc.) may be associated with the resident and the destination party. Playback of recordings is made available through an administrative web interface provided by the processing center. Recordings and text are also available for remote download via the web interface provided by the processing center.

The described system can charge residents for access on a timed (per minute) basis. The billing rate can be adjusted based on the activity and the time of day. For example, video calls at 6 am may be $0.20/min and at 8 pm they may be $0.50/min. Each resident has their own account, and funds are deducted from their account as they use the kiosk 102. The kiosk 102 may display a running total of funds or remaining time for a particular activity. When a resident launches a new application on the kiosk 102, they are informed of the current rate for that activity. Pricing can be set using the administrative web interface.

Additionally, the system may support multiple accounts for different features. For example, a commissary account may be separate and external from a prepaid calling account or an entertainment account. The kiosk 102 can provide the ability to transfer funds from one account to another, if enabled by administrative staff.

Figure 18:
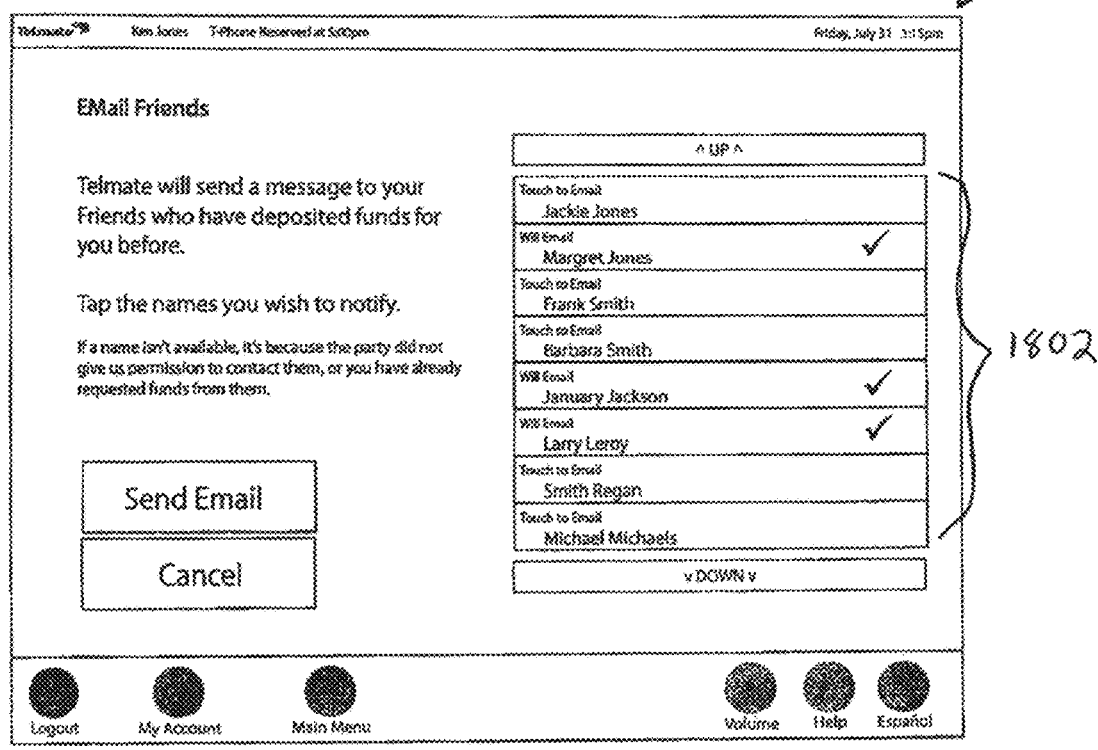
FIG. 18 illustrates an example fund request screen of the kiosk interface.

If a resident has exhausted available funds, a prompt is displayed allowing the resident to send a pre-formatted email to contacts that have been associated with them. An example fund request screen 1801 is illustrated in FIG. 18. The associated contacts 1802 would be individuals that have in the past provided funds to the resident's account. The pre-formatted email would request additional funds. The system can restrict the number of requests that are allowed in a given time period. For example, the system may only allow one request to be sent to each associated contact every 30 days. The system will only allow one outstanding request per contact to avoid harassment. The receiving party can reply to the email to have their name blocked at any time. Since the message is pre-formatted, the resident cannot use the fund request email for any other purpose.

The kiosk 102 also allows a resident to request a visitation appointment. A resident can request a visitation with anyone that has a system account and has an established relationship with the resident. For example, the resident can request a visitation appointment with individuals that have made a funds deposit for the resident or have communicated via phone, text, or video. The resident can optionally pay for both sides of the visitation using their available funds, or only their own side, or they can request that the outside party accepting the visitation pay for both sides. The appointment request message is submitted, and if approved by administrative staff, is forwarded to the visitor by SMS or email messaging. The visitor can proceed to schedule the appointing using a web interface accessible via the Internet. Alternatively, a visitor can initiate a visitation request using the website, and it can be forwarded to the resident for scheduling via the kiosk 102. When a visitor requests a visitation, they may be required to pay for both sides of the visitation.

Appointment reminders may be provided via the kiosk 102 in increments leading up to the appointment (e.g., 2 days, 1 day, and 1 hour before an appointment). The resident may need to log in to an available kiosk 102 during their visitation window to participate in the appointment. If the resident has not logged in after a predetermined period of time, the appointment may be canceled.

Visitation fees can be set to accrue at both ends of the conversation. For example, the resident may pay a rate based on the minute rate in effect at the current time, and the visitor would pay the rate at their location. Visitation fees may be pre-paid at the time of reservation.

Visitation rules can be set on a per-facility basis. For example, facilities may limit the number and times of visits on a global or a per-resident basis. The rules are defined in the administrative web interface and can be selected or changed at any time. On-site visits can be conducted through kiosks 102 in a visitor's area of the secure facility. If required at the facility, these visits may be provided without charge. A visitor may, however, elect to exceed an allotted free time by paying for additional time, if permitted by the configuration settings of the facility. Funds can be deposited locally via the kiosk 102, or by accessing funds in a pre-existing account.

The kiosk 102 may also provide remote monitoring capabilities. By accessing a web interface provided by the processing center 150, 250 (illustrated in FIGS. 2 and 3), an administrator can remotely activate the camera and/or microphone on a kiosk 102. This would enable the administrator to covertly monitor the area within the kiosk camera 303 field-of-view.

Aspects of the subject technology also use handheld video visitation. As discussed above, detention environments (e.g., jails, prisons, detention facilities, secured hospitals, addiction treatment facilities, etc.) may house large populations of individuals in confinement, which presents unique administrative challenges. In such detention environments, detained individuals may frequently desire to communicate with individuals outside the detention environment (outside parties) such as friends or family members. Whereas in-person visitation may cause great expense and many different security risks, many facilities are now starting to use video visitation, wherein specialized videoconferencing systems may be used to allow friends and family members to visit with incarcerated individuals from the lobbies of the facilities (e.g., on-site video visitations), the lobbies of other facilities with a suitable service, or even a computer (e.g., a desktop, a laptop, etc.) suitably equipped with a web camera and video conferencing or web browser software. This latter method is typically called "remote video visitation." In some aspects, this system may include a scenario in which at least one endpoint is a handheld device (e.g., a mobile phone, a tablet, etc.), and thus is typically called "mobile video visitation."

The second endpoint in the foregoing video visitations may be inside the secure facilities near the inmates' cells. Custom network computing terminals, such as video visitation kiosks, installed inside these secure facilities for such purposes can be hardened against physical and electronic attempts to circumvent their being used contrary to the facilities' rules, as these are generally owned and operated exclusively by a single company at any particular facility, which has an exclusive contract to provide such equipment and services to that facility.

As discussed above, secure facilities may require additional levels of monitoring and oversight that are not required when similar services are provided to other populations. Although two-way video conferencing is now quite common on desktop and laptop computers suitably equipped with appropriate hardware and software, and is now becoming available on commonly available computing tablets and smartphones with wireless Internet connections, the increased transportability and concomitant increased usage and propensity to share use of a device with multiple people increases security concerns related to allowing such video visitations for inmates.

The advent of smartphones and computer tablets with always-on Internet connections, and their ability to support video conferencing using hardware and software features available thereon, allows such devices to be preferred devices for many people who desire to have more frequent communications with their friends and family members who are residents of these secure facilities. The mobility of these devices poses both problems and opportunities for their use as remote video visitation terminals.

Yet, features that are more common in tablets and smartphones than they ever were in laptop computers, including GPS receivers, cellular data modems, accelerometers, multiple still/video cameras, speakerphones, compasses, and app stores, may provide the opportunity to access, install, and secure software more readily, and to augment the data transmitted in conjunction with remote video visits for the purposes of authorization, authentication, and later investigation by facility administrators or law enforcement officials. The convergence of the desire for frequent communication with inmates with the commonly available mobile computing devices and pervasive, wireless Internet access may provide many opportunities for innovations that serve to improve the morale of both inmates and those that care about them, as well as aiding rehabilitation and reducing recidivism.

Additionally, there is a strong personal and business desire to eliminate the financial barriers inherent with owning a desktop or laptop computer for friends and family members of inmates, who are often on the lower economic rungs of society, and can ill-afford even a low-end computer and a monthly broadband Internet access bill that is sufficiently fast to support two-way videoconferencing. Whereas low-end smartphones and networked tablet computers are often available for less than the cost of a low-end laptop computer, and can be used on various wireless Internet access points (e.g., such as those found at libraries, coffee shops, and fast-food restaurants, where one may sit and surf the web without any recurring financial obligation, other than to make an occasional food or beverage purchase, or at all), the ability to allow use of these devices for such low-income persons so as to remote video visit with their friends and family who are incarcerated is highly desirable.

Additionally, since these devices are far more portable than desktop or laptop computers, individuals are likely to have them on their person and be able to conduct remote video visits or other activities far more frequently and during a greater number of periods during the day. During periods of lower usage of either or both of the limited number of video visitation kiosks inside the secure facilities (where a ratio of one device for every 10 or more inmates may be common), and/or available Internet bandwidth at both the secure facility and the datacenter(s), a facility may offer automated incentives to either of or both the inmate and visitors to conduct video visitations and other activities so as to optimize the usage of these scarce and costly resources.

Aspects of the subject technology also use a secure social network as described in U.S. patent application Publication Ser. No. 13/438,940, which is incorporated by reference herein. In some aspects, this system provides a method for facilitating the exchange or transmission of information between members of a social network in which at least one member is subject to limitations of a controlled facility including the steps of: receiving content in an electronic form from a member for display to members or intended members of the social network; evaluating the received content to determine if it is appropriate for display to the members or intended members of the social network; allowing the received content to be viewed by the members or intended members of the social network only if it is deemed appropriate for display in the evaluating step; and recording data relative to one or more of the receiving, evaluating, and allowing steps.

In some aspects, this system provides for facilitating the exchange or transmission of information between members of a social network in which at least one member is subject to limitations of a controlled facility, including: a data receiving module configured to receive content in an electronic form from a user for display to members or intended members of the social network; an evaluation module configured to evaluate the received content and determine if it is appropriate for display to the members or intended members of the social network; a content dissemination module configured to provide received content that is deemed appropriate by the evaluation module to the members or intended members of the social network for viewing; and a data recording module configured to record data relative to the actions of one or more of the data receiving module, the evaluation module, and the content dissemination module.

In some aspects, the system provides a method for facilitating and securing the exchange or transmission of information between two or more parties in which at least one of those parties is subject to special security or law enforcement limitations or otherwise resides in, or is subject to the controls of a controlled facility (e.g., a detention environment) and one or more participating parties may be similarly subject to special security law enforcement limitations or otherwise reside in a controlled facility or may not reside in a detention environment, such as friends of the detainee, family members, co-workers, medical personnel, counselors, faith leaders, and/or other people. Exchanged or transmitted information may be member generated, such as a photo or a video message, or it may be member-curated, such as a news headline, a famous quote, or a sports score.

According to certain aspects, a controlled environment or controlled facility may be an environment or facility in which individuals are confined or otherwise subject to supervision. This includes, but is not limited to, detention facilities, prisons, secure hospitals, and secure addiction treatment facilities. Administrators who are associated with a controlled environment may separately be administrators as well as members of the social network.

According to certain aspects, a group of individuals organized to transmit or exchange member-generated and/or member-curated content may be referred to herein as a "social network." Members of a social network may elect to exchange information with or transmit information to all participants within the social network, a minority of participants, and/or a group that encompasses other participants plus others that may be connected by second or subsequent degree links (e.g., friends of friends). Exchange with or among second or subsequent degree members may also be denied, limited, and/or restricted for safety and security reasons.

Social network members may be required to authenticate themselves in order to verify their identity. This identification may include one or more of the following: user name, password, voiceprint authentication, face verification, identifying body marks and features verification, retina verification, and palm or fingerprint verification. There may be a need, from time-to-time, for administrators to require participants to re-enroll in the authentication process. For example, a user who has visibly aged may be required to re-enroll in a face verification process to ensure an updated image is used for comparison.

Because one or more of the individuals participating in this information exchange may reside in or is subject to a detention environment, there is a need for facility staff, or those working with a facility (which may generically be referred to as administrators), to control which participants may communicate with other participants and/or what information is or may be exchanged among various participants or within the system generally. Additionally, an automated process may be used to supplement or replace the human review of submitted information or other requested actions. For example, an administrator may wish to prevent an incarcerated gang member from communicating with a former cohort who is not incarcerated. Also, an administrator may edit, redact, delay, and/or block submitted content, such as a facility guard's shift schedule or an image depicting a guard, from one or more parties participating in the social network. Also, an automated process may redact or block submissions containing offensive or other classified words.

Aspects of the subject technology utilizes the foregoing systems used to arrange, transport, and conduct the communications described above. In some aspects, biometrics may be used to establish links to identities. Upon detainment for or conviction of a crime, an individual is typically incarcerated in a secure facility, such as a jail or prison. During the intake process, the belongings on the individual's person are confiscated, analyzed, and stored for use in the criminal investigation and court case, and eventually returned to the individual upon their release (with the exception of any illegal items, which are generally kept from the individual). Once the intake process is complete, the individual is then generally referred to as an inmate.

The confiscated items may contain many things which could aid in the accurate identification of the inmate, such as driver's license, credit cards, address book, cellular telephone containing an electronic contact list, business cards, paper and electronic notes, and various computing devices (some of which may contain additional electronic contact lists, photographs, telephone numbers, computer hardware or service logins or indications thereof, computerized social networking accounts, etc.). The various electronic contact lists, including telephone numbers, e-mail addresses, and social networking accounts may be imported into systems used for secure social network priming.

Thereafter, the inmate is placed before either a booking kiosk (e.g., as described in U.S. patent application Publication Ser. No. 13/490,054: System and Method for Identity Verification in a Detention Environment) or a video visitation kiosk (e.g., as described in U.S. patent application Publication Ser. No. 13/088,883: Interactive Audio/Video System and Device for Use in a Secure Facility) for enrollment in a video visitation system (e.g., as described in the foregoing patent application). The enrollment process includes assigning the inmate a unique identification (ID) (e.g., called a personal identification number (PIN), which may or may not be the same as the inmate's booking number, but which may be unique at least within the facility in which he is incarcerated), a full name, a profile photo, and/or other identifying information. The enrollment preferably also includes additional biometric scans, including use of a fingerprint reader and/or iris print reader. The profile photo may be recorded as a short video clip, even if presented as a single still image. The inmate's profile may additionally be linked to, or have data imported from, the facility's Jail Management System (JMS), which is a computerized record-keeping system generally used by secure facilities to track all manner of status relating to each inmate, including charges and booking information, dietary restrictions, gang affiliations, intake and expected release dates, etc.

With respect to the voice enrollment, the minimum recording needed is typically for the person to state his name. However, as this is typically shorter in duration than the ideal length of audio sample desired for comparison, as described below, and because having inmates read a predefined string of text has been shown to be recognized by the inmates as a means of capturing their natural speaking voice, methods of capturing longer samples whereby the inmate is unaware of the purpose and/or unable to alter his voice suitably enough under the circumstances to subvert the system are desirable.

Also, since the percentage of the incarcerated population overall that is illiterate or semi-literate can be substantial, using on-screen text as a means of causing the inmate to speak is impractical and may frequently result in voice patterns that differ significantly from their natural speaking voice, and thus may be less reliable as a means for future voiceprint comparison.

Hence, according to certain aspects, the enrollment process preferably asks the inmate a series of questions, which may preferably be randomly generated, of an innocuous or specific nature, with the pretense that these answers are needed for one or more of the following reasons, among others:

Speech-to-text training, for more accurate interaction with the system's interactive voice response (IVR) menus.

Security of the inmate's account on the system, by asking questions nominally only the inmate would know, as is done on websites requiring some greater level of security, such as what online banking sites do. Examples include "what city do you like to vacation in most?". "what was your first-grade teacher's name?", and so-on.

For building a social network profile. These questions may be preferable, because they can be phrased to elicit longer responses which are more useful for creating comparison samples, and because they may be less likely to cause the inmate to attempt to disguise his normal speaking voice. Examples include, but are not limited to, questions such as "In about 25 words, describe your first date", "tell me about your last cell-mate; what did the two of you do to pass the time?", or "what is the first thing you're going to do when you get out—what is motivating you to behave during your stay here?". Optionally, one or more of these questions may be designed to elicit an angry or otherwise stressed response, to provide a more accurate comparison with the stress analysis features described below.

In some aspects, an investigator may manually listen to any calls a newly incarcerated inmate makes and manually select suitably long and normal-voice segments to use as the basis for future voiceprint comparisons. In some aspects, the system may allow individuals to select which language voice prompts are issued in. In this case, the voice enrollment sample may be tagged with said language. However, the system may purposely mix in a few questions in the next-most-commonly spoken language or two in the nearby geographical region, with the hope that the individual may actually answer in said language(s), thereby inadvertently revealing the ability to understand and speak in these other said languages. Such samples are also tagged with the language, for later investigative use, as described below. Each new language/sample pairing is considered a "flavor" of the individual's voice, and are grouped together.

In the case where there is not a long enough audio recording from the enrollment session, a facility administrator or investigator may manually review audio from any of the inmate's phone calls, and extract a suitably long and normal speaking voice segment, and store it in the system as a voice sample. Preferably, the administrator/investigator may use some accurate means of verifying that the voice sample belongs to the inmate, such as knowing his voice by nature of being a correctional officer assigned to the inmate's area within the facility, having interviewed him, or having video showing the inmate's lips moving in sync with the audio being reviewed.

Although visitors (e.g., friends & family) using the telephone system on the outside are not generally required to go through the same enrollment procedure as the inmates are, the facility investigators may optionally use the above-described procedure to mark a suitable audio clip from any of their communications as being a particular individual. The information used to assign this match of voice to an individual may be aided by personal familiarity with the individual or by the system automatically (e.g., as described below) matching the voice to some instance where video is available, such as a lobby security camera or a separate occurrence in a video visitation.

At another point in the same enrollment (e.g., for video visitation service (VVS) systems), a more comprehensive and useful set of images may be captured for the purposes of later facial recognition. Standard single two-dimensional (2D) images of faces are known to be useful for facial recognition, but may also be easily spoofed by life-size photos of an authorized individual being turned into a paper or more sophisticated mask, and then used by an unauthorized individual to impersonate the authorized individual.

Adding additional still images taken at multiple different angles can enhance facial recognition, especially in cases where later comparisons do not include a straight-on capture of the individual. Additionally, even greater facial recognition accuracy can be achieved when comparisons are done on motion video captures, which may optionally be used to create a three-dimensional (3D) model of the individual's face.

Hence, the profile-photo capture enrollment of the present invention continues to take the traditional straight-on face capture, a.k.a. "headshot," and then surreptitiously begins capturing multiple still and video images of the person, while simultaneously directing him to touch, read, and thus hopefully look at various elements on the display (e.g., any of the screens shown in FIGS. 5-18), at widely spaced locations, so as to encourage him to turn and/or tilt his head. This process may include instructions to locate and read or describe numbers, letters, strings of text, colored shapes, or other similar information printed on the enrollment kiosk, at locations further from the screen, so as to encourage the inmate to turn and/or tilt his head to an even greater degree.

Further, multiple kiosks located near each other in the same facility may coordinate the generation of various sound effects, timed to cause the user of one kiosk to look at a neighboring kiosk, with the intent likewise being getting the subject to turn, twist, or tilt his head a greater amount than is possible using only cues generated on the kiosk the subject is currently using.

At some facilities, inmates may be issued identification wristbands, which are fastened around one wrist, in the location one normally wears a wristwatch. Such wristbands may be constructed so as to be difficult to remove using any materials available to the inmates, and may contain one or more of the following identification types:

a one-dimensional (1D) and/or 2D barcode, such as a DataMatrix or QR Code (as described in their respective ISO standards documents);

radio-frequency identification (RFID), which uses self-powered or RF-powered circuitry to transmit or respond to a transmission requesting the in-kind transmission or exchange of identifying information, preferably using data encryption and/or digital signatures, as commonly practiced;

a photo of the inmate, preferably of his booking photo;

a hologram, to aid in proving the wristband is authentic and has not been tampered with; and/or global positioning system (GPS) or similar location-tracking technology, preferably one that works indoors.

One or more of the above-described identification features may be required to be interfaced with and authenticated to any of the communications terminals each inmate uses, as an additional means of security. In the case where the wristband contains a GPS or indoor-capable location tracking device, the wristband may also serve to track the inmate's location within the facility, to enhance the system's ability to route incoming requests for communications to terminal equipment to which the inmate has access to at the time of said communication request. In the simplest case, the barcode on the wristband may be held up to the camera on the video visitation kiosk, preferably adjacent to the inmate's face, so as to provide multiple visual means of verifying identification, and as a means for most efficiently and quickly identifying the inmate (e.g., via the barcode, which may be decoded with great speed and reliability with commonly available hardware and software, especially if it is a 2D barcode), thus allowing the system to perform an immediate pairwise comparison of the stored profile photo associated with the inmate that is assigned the barcoded wristband.

With enrollment complete, the initial methods used to investigate and verify the identity of the newly enrolled inmate may now be described.

After initial enrollment, the inmate may thereafter be brought to the section of the facility he is assigned to, and placed in his assigned cell. At some point thereafter, the inmate may be given the opportunity to use telephones or video visitation kiosks located near his cell and accessible to him. Upon making his first call or video visitation, the system may capture the audio and (if applicable) video streams of the call or visit, along with details about the phone number or visitor contacted, as is typically done for each call or visit.

However, special attention is given to these first recordings, for the purposes of matching the inmate's biometrics to those of previously detained individuals. Up to now, no effort has been made to attempt to identify the inmate's potential use of a false identity, so as to avoid discouraging him from continuing to believe he has succeeded in the deception, and will thus continue with typical patterns of contact, so as to provide useful data to facility administrators and investigators.

Next, the inmate's calls and video visitations over an initial period (e.g., which may preferably be several weeks for facilities with high average incarceration times, yet as low as a few days or hours for facilities with low average incarceration times) may be cataloged and recorded, and a similar voice and facial recognition is performed on all of the people whom the inmate communicates with, and the recorded samples are also compared against the above-mentioned databases. The telephone numbers, e-mail addresses, and/or other electronic contact addresses used by the inmate to attempt communications may also be compared against the contacts all other inmates at all facilities served by inmate telephone service (ITS) and VVS systems have made during a similar initial period of their incarceration.

In some aspects, the inmate's use of other features on the audio/video kiosk may be logged over the same initial period, including web browsing history, video games played, educational resources used, commissary items bought, medical issues reported, legal terms and documents searched, religious services viewed, self-help groups (e.g., such as AA, NA, etc.) joined or interacted with, music, TV, video, other media listened to or viewed, and/or any number of other features and services provided by the audio/video kiosk. In some aspects, the funding sources for the inmate's trust account, telephone calls, video visitations, and geographic locations thereof may be logged over the same initial period.

In some aspects, concurrently or at a later time, the system may begin comparing the inmate's voice (and/or other voices in the inmate's communications) to all other voiceprints in the system. This job can run at a lower priority only when the servers are idle, such as overnight, as the data set may be extremely large and the answer can wait a few days or weeks. To speed the search and aid in the detection of users who change phone numbers or online IDs frequently, the initial searches may be confined to voiceprints from the last N hours or days. Ideally, this search may widen in reverse chronological order, based on the most recent time each voiceprint on file communicated via the system. The comparisons may be useful for tracking inmates via patterns. Although the comparisons are described as voice comparisons, it is understood that any aspect of the communication engaged in by the inmate can be compared, including video, contact information, known identities of individuals being communicated with, the time of the communication, etc. In some aspects, an individual's use of communications systems may be tracked (e.g., using data mining). In some aspects, the comparisons may begin when a new inmate, friend, and/or family member registers.

According to certain aspects, at the end of this initial period, the collected data may be automatically analyzed by the system for repeating identical or similar patterns of usage of all or a subset of the above-mentioned items during a similar initial period length, for all previous inmates at the same facility and/or at all other facilities served at any point by the same system. The results may then be scored, ranked, and presented to a facility administrator or investigator, along with photos and personal identifying details of each inmate record with patterns similar to the newly incarcerated inmate. The investigator may then evaluate whether the newly incarcerated inmate has any connection to another individual sharing the same or similar profile (e.g., they may potentially be the same person since an inmate may sometimes provide false identification information to facility administrators or investigators or simply not provide any identification information at all).

In some aspects, subject to the exclusion of certain types of commonly dialed numbers (such as bail bonds offices and public defenders), particular weight may be given to the first number called if a match is found to the first number dialed for any other inmate recorded in the system. Similar weight may be given to the first number dialed, if the number does not match any other first number dialed but a lookup in a database such as best-known name and address (BKNA), online white pages, or reverse number lookup is the same. Either of these matches on the first number called or same name or address on first number called may trigger an automatic review by facility administrators, wherein the profile and booking photos, and all identifying information about the inmates is presented on-screen.

Regardless of an identical or close match on the first number dialed by the inmate, a second level of comparisons covering all calls, visits, and/or funds deposited over the same initial period may be performed. In some aspects, several methods of analyzing similar patterns of commonality among these data are performed, including but not limited to:

a simple comparison of the percentage of all calls, visits, and funding sources over the initial period being the same or related;

a sliding window of the first N calls being the same, whereby the system checks the first two calls from among all inmates, then the first three, then the first four, and so-on up to a certain point which may be defined as when the length or cost of searching the database becomes too great, or the percentage of successful matches drops below a given threshold; and/or other methods of statistical analysis.

According to certain aspects, any apparent pairs of inmates using different aliases that are confirmed by the facility investigator as being the same individual (by whatever verification tests deemed appropriate by the facility), the investigator may then indicate to the system which pairs of aliases are, in fact, the same individual, and all said system profiles for said aliases may be merged into one profile by the system, preserving a complete history of all records, and either maintaining the unique database key of one of the profiles, or preferably creating a new unique database key.

One difficulty in presenting the above-described information is that when suspected aliases originate from different facilities having different owners or operators (for instance, typically the Sheriff of a county), the owners or operators may have rules that give their ownership of certain type of inmate profile information, and may prevent the details from being shared with other facilities without their express permission. In such cases, the system may indicate that there is a match to certain types of data (e.g., N number of calls in common, or inmate heights match within a 5% tolerance) without displaying the exact content or details of the information from facilities outside the jurisdiction or operational control of the facility performing the investigation.

In some aspects, the percentages or thresholds used to filter and display suspected aliases of the same inmate may be predetermined. In some aspects, the facility investigators may manually adjust the percentages or thresholds. The system may record which percentages and/or thresholds may result in the highest percentage of confirmed aliases, and report these results back to the software developer, or automatically back to a central system (e.g., a central system software, processing center 150, processing center 250, etc.). The central system may then automatically use the aggregate settings and success rates reported by all facilities served by the system to adjust the default percentages and thresholds initially presented to investigators. Thus, over time, the system may be self-learning, and may begin reporting the most common dialing, visiting, and/or other patterns associated with the use of aliases or false identities.

The process used to analyze audio, video, and/or graphical communications using the above-described systems, for the purposes of authorization, authentication, security, and investigative purposes may be described in greater detail below. According to certain aspects, voice analysis may be performed. During any and all of the above-described telephone calls and/or video visitations, one or more of the central processing systems described may simultaneously archive and analyze the audio stream, thus allowing for either or both real-time and after-the-fact review and analysis of the communication session. However, in some aspects, due to computational and other requirements, some of the below-described capabilities may not be available for real-time review or analysis, and may instead only be available in after-the-fact review and analysis, after some variable length of time sufficient for the necessary data collection, processing, and/or comparisons are complete.

According to certain aspects, a first step in processing the audio may be to split the audio into chunks. FIGS. 19A and 19B illustrate an example audio 1900 that may be displayed (e.g., to an investigator). Because a capability is to detect when and for what duration voices suspected to be other than the initial and authorized voice may be speaking, it may be inappropriate to use voice recognition analysis on the entire length of the conversation, as even if the analysis indicated a positive match for the initial speaker, one or more additional speakers could speak for brief periods without lowering the score sufficiently to trigger an indication that there is an additional and potentially unauthorized voice speaking. Additionally, voice recognition and comparisons may exclude periods of silence in order to achieve reliable results.

Hence, the entire audio stream, preferably split into one channel for each terminal equipment and/or channel on said terminal equipment (e.g., from stereo microphones on desktops, laptops, mobile phones, tablets, etc.), may be analyzed for periods of silence, and split at or near the beginning and end of said lengths of silence. As shown in FIG. 19B, audio 1900 includes length of silence 1904 and one or more chunks 1902a, 1902b, and 1902c. Chunks 1902a, 1902b, and 1902c may indicate that at least one user is speaking. According to certain aspects, a minimum length of continuous voice used for recognition may be about 3 seconds. In some aspects, a length that may produce accurate results may be in the range of 9 to 12 seconds. In this regard, the system may first remove long periods of silence (e.g., those greater than 0.5 seconds such as length of silence 1904), and may attempt to split and then recombine, or "chunk" the remaining audio into segments of between 9 and 12, or as many as 45 seconds each. For example, length of silence 1904 (and all other detected segments of silences) can be removed. Then the remaining chunks of audio (e.g., chunks 1902a, 1902b, 1902c, and other chunks therebetween) can be combined together to form a bigger chunk having a suitable length (e.g., 9-45 seconds). However, according to certain aspects, it is understood that each chunk may have any suitable length greater than or less than this range (e.g., greater than 45 seconds, or even less than 3 seconds such as in the detection of non-speech sounds).

In some aspects, each chunk on each audio channel may be compared against one or more previously recorded samples, especially including the individual's enrollment samples, on a pairwise basis. Each comparison by the voice recognition algorithm may result in a numeric score, typically expressed as a floating point value between 0.0 and 1.0, where values closer to 1.0 express a greater likelihood that the two samples are in fact the same person. However, other numeric scores greater than or less than these values may be used.

In some aspects, when such a system is used in the case where the potential number of speakers is large and unknown, such comparisons can be extremely time-consuming and expensive, both computationally and financially, and may not necessarily be possible in real-time. However, in the case where the number and identity of individuals authorized to and/or with access to specific terminal equipment is known and limited to a lesser or greater extent, such pairwise comparisons can be selected and performed on a far more efficient basis, thus lowering the cost and increasing the accuracy and speed of recognition. For instance, in the case where a particular terminal equipment or grouping of terminal equipment is located in a room where only members of a group limited to perhaps a few dozen individuals reside, the number of comparisons needed to be made to determine the identity of the individual speaking is sufficiently small as to be possible to accomplish in far less than one second of computational time on computing platforms that are commonly available.

According to certain aspects, if an initial search against stored biometric records of all inmates assigned to the room in which the terminal equipment is located turns up negative or only marginally likely matches, the search may then be expanded to, for example, adjacent rooms, then to all rooms on the same floor, then all rooms in the same wing, then all rooms in the same facility, then all facilities within the same county, then all facilities in the state, and finally to all facilities nation-wide. At any point in the expanding search, searching of a wider area or larger numbers of inmates may be suspended once a sufficient number of likely matches has been found. These results may then be paired with records pertaining to each voice (e.g. each inmate), such as their original voice and image enrollments, standard identifying information such as name, booking ID, height, weight, hair and eye color, identifying marks, charges or convictions, etc., and displayed on an investigator's terminal in a manner associated with the present audio and/or video recording being analyzed (e.g., if in real-time monitoring mode), along with a confidence score for each possible match, and said information is encoded as metadata and stored with the communications recording for later display on an investigator's terminal in the same manner.

Once detected and displayed on-screen, the investigator may then listen to the audio clip suspected to be one of the on-screen individuals, then play the enrollment audio clip for each of the remaining suspected matches. If this initial comparison is sufficient for the investigator to identify the correct match, he is given the opportunity to so mark that chunk in the audio stream. If more information is needed, the investigator may listen to all other chunks in the audio stream that seem to match the first where the new voice was detected, and optionally drill down into each suspected match's communication recordings and listen to actual phone or video calls made by that individual, so as to hear a wider sampling of their voice. Once the first chunk identified as a different voice is so marked as belonging to a particular individual, all remaining chunks in the audio stream matching said individual are marked with the same metadata, so that continued playback of the file can be suitably annotated with all of the speakers present. The preceding steps may be repeated for each additional voice detected in the audio streams.

Once the chunks have been analyzed, scored, and/or matched, at each point in the recording where the voice changes, the display of the audio stream may be annotated with an indication of the change, which may preferably include a thumbnail view of the individuals photo, if it exists in the system, and additional metadata about the individual, as well as a confidence score of the match. For example, a photo of one user (and/or corresponding metadata, confidence score, etc.) may be placed next to chunk 1902a to indicate that this user may be the speaker corresponding to chunk 1902a, while a photo of another user (and/or corresponding metadata, confidence score, etc.) may be placed next to chunk 1902b to indicate that this user may be the speaker corresponding to chunk 1902b. However, other suitable methods to identify known and unknown sounds, as well as methods to distinguish users from one another (or from other background sounds), may be used. For example, different colors and/or shapes may be used to identify sounds and to distinguish users (and other sound generators) from one another. Additionally, each chunk of audio may also be annotated with the original match score, either by displaying the number adjacent to the chunk, or by displaying a graph (preferably a line graph) below the image graph of the audio stream, with one data point for each chunk.

In some aspects, for any chunks known confidently as corresponding to an individual, one or more of these chunks so-identified may optionally be compared to other chunks flagged as an unknown individual, whether or not they are recorded in conversations involving the same facility or any facility using the same system. Should any matches be found, these chunks may be flagged with a unique database key or other identifying property already associated with that unknown voiceprint. If no such matches are found, a new unique "John Doe"-like name and unique ID may be assigned to it, with a new unknown identity record being located in the same or an affiliated database.

According to certain aspects, in the special case where a voiceprint associated with an individual that the inmate is prohibited from communicating with appears in the audio stream, the message may be alarmed for immediate action by facility staff or investigators, and the locations in the audio stream where said prohibited individual is speaking may then be flagged with metadata that may preferably cause a warning symbol to appear on the audio timeline.

In some aspects, in the cases where any unknown individual makes repeated calls to one or more inmates at one or more facilities served by the system, as the number of these conversations increases, the likelihood said individual may provide investigators with sufficient information with which to correctly identify said individual may increase. By comparing all unknown voiceprints recorded by the system with each other, and ensuring that no duplicate unique IDs are assigned to the collection of voice chunks determined to be a unique individual, the body of such data can continue to grow over time and be automatically indexed and thus searchable.

According to certain aspects, when multiple individual voices are heard on the same audio channel, and the percentage of their contribution to the audio on that channel is significant, the system may give the investigator the opportunity, instead of showing each speaker interleaved on the one visual graph of that channel, to instead separate and stack these additional voices on separate visual audio timelines. These audio timelines may then be labeled either with the name of the individual (if known), or the above-described unique ID and "John Doe"-like name, so as to make it easier to follow and or listen to just that individual's contributions to the conversation.

In the case that multiple individual voices are heard on the same audio channel, the system may flag the conversation as possibly containing an unauthorized 3-way call and may be flagged for manual analysis using the tools and techniques described herein. Such detection may be based on any case of multiple voices being detected on the same communications channel, or in the case of multiple voices being detected within a specified number of seconds, as in, for example, 2 voices detected within any span of audio between 3 and 9 seconds in length. Whenever multiple persons are speaking on the same communications channel, all such persons may be likely to occasionally talk at the same time, and any chunks comprising entirely or partially of such overlapping voices (e.g., a composite voice) may likely be detected as an additional unidentified voice, and fail to match any other voiceprint in the system, aside from others comprising the same individuals speaking simultaneously. It may be apparent that these chunks of audio may be difficult or impossible to understand and/or identify which individuals are speaking. Consequently, the system may allow the investigator reviewing the audio streams to flag such segments as "unknown combination of speakers." Such segments may optionally be reviewed later by persons specially trained in separating or understanding multiple voices, and/or by sophisticated automated analysis tools capable of the same. In the case where multiple voices are heard on any one channel, and that channel originates on a terminal equipment inside a secure facility, the additional voices may be assumed to be inmates, or possibly, facility staff, and compared against those databases of voiceprints first.

In the case where multiple voices are heard on any one channel, and that channel originates on a terminal equipment outside the secure facility, the additional voices may at first be assumed to be friends or family members, and compared against various subsets of registered friends and family members of the system, preferably beginning with those members who have previously called that inmate and/or that facility, and then widening the comparison groups in a similar manner as with the inmate comparisons described above. If none of the voices can be matched to a registered friend and family member, the system may preferably begin searching the database of inmate voiceprints. In the case one or more likely matches are found to the inmate database, the call may be flagged, in addition to being a possible unauthorized 3-way call, as containing unauthorized inmate-to-inmate communications, and receive an even higher priority, likely triggering immediate review by an investigator.

In the case where none of the voiceprints in the system match the unidentified voiceprint chunk being compared, or at any point in between expanding the set of voiceprints to be compared against, the system and/or investigator may determine that it is worth considering that the "new voice" may simply be the original individual, who is properly authenticated and authorized to use the terminal equipment, speaking differently enough so as to cause the comparative score to change beyond the "same voice" threshold. This may be the case when the person begins talking in another language, when he whispers or shouts, talks in a romantic "pet voice," when he impersonates another individual, or when he purposely trying to fool the voice recognition system.

In fact, many investigators may chose to evaluate the foregoing possibility as the first step prior to widening the set of voiceprints to be searched, should that widening involve a significant time delay, since such changes in voice can be relatively common. As a first aid in making this determination, the system may take advantage of having samples of the individual's voice tagged with one or more languages during enrollment, or manually by other investigators during prior reviews. These "new voices" can first be compared with other variants (e.g., "flavors") of the individual's voice to determine if another language is being spoken. Also, while listening to the conversation as a whole, the investigator may have sufficient clues so as to determine that the "new voices" are one of the types listed above. For instance, if the audio stream is part of a video visitation, the investigator can watch the individual's mouth to determine if he is the one uttering the sounds in these "new voice" chunks. Or if a security camera covering the terminal shows only one inmate operating the terminal, and the investigator recognizes the inmate as the one speaking in the audio being reviewed, the investigator can come to the same conclusion. He can then tag this voiceprint as an additional voice flavor for the individual, increasing the set of flavors that are automatically compared against the voice of the person authorized to use that terminal equipment, prior to expanding the search to other individuals.

In some aspects, the detection of human voices may also be augmented by specialized routines that detect certain sounds commonly heard outside of facilities, such as locomotive trains, crossing gates, whistles, emergency vehicle sirens, car horns, music, broadcast radio and television audio, and thunder, and other sounds not commonly heard, but of high interest, such as gunshots. The type and temporal pattern of any such sounds heard during each communication session are noted and archived along with the communication session. Such archive may include information such as "two gunshots heard 2 seconds apart, followed by a car horn 20 seconds later lasting for 3 seconds," in a manner that can be quickly and automatically compared to other similar patterns heard and archived in other communication sessions using the same system. Whenever such patterns match sufficiently, the respective communication sessions the multiple instances were recorded on are flagged as a possible multi-party call.

For this reason, any chunks of audio that are determined to not be human voices, may instead be marked as background sounds, and compared to other archived chunks of audio also marked as background sounds, then run through voice and speaker recognition software in an attempt to find matches, and through other specialized audio comparison software designed to compare non-voice sounds for likely matches. Any such matches may be flagged for human review, so as to provide further evidence of unauthorized multi-party communications, of calls originating from a common location (e.g., as in the same or nearby payphone at a train station with unique sounds, a club or concert with the same music playing in the background, and so on), and other audible indications that calls or the location of calls may be related.

Although chunks of audio are described herein, it is understood that chunks of images and/or video may be treated in the same or similar manner as described above. In some aspects, image and/or video analysis (e.g., facial recognition) may be performed in the same or similar manner as described above with respect to the audio analysis. In some aspects, during video visitations, and while an inmate or friend and family member is using a handheld video visitation device, whether for the purpose of conducting a handheld video visitation or for the purpose of communicating using a secure social network, any available microphones and/or any available video cameras may be enabled and actively recording, even if neither audio nor video is meant to be part of the communications. In this latter case, said monitoring of audio and video may be used exclusively for the dual purposes of identifying the individual(s) using the device (ensuring that only authorized individuals are communicating), and for the purpose of intelligence gathering.

Also, to the extent that photographs from the inmate's phone or other devices were found and imported during his initial intake, said photos may also be scanned by the facial recognition system for likely matches against images already in the system. During any of the above-described communications, in addition to the above-described voice analysis, the video stream from the terminal equipment's camera may be archived and analyzed in a similar manner as are the voice channels.

According to certain aspects, in the case of video streams, different forms of chunking may be used in order to segment the video into segments small and self-consistent enough to be useful for the purposes of facial and/or other identification. In some aspects, chunks may comprise the same time-points as the audio chunks. These video chunks may hopefully contain only one individual throughout their length, and can be matched to the audio and played together simultaneously.

In some aspects, chunks may be determined by properties inherent to compressed video streams. In two commonly used video compression schemes, for instance, MPEG-2 and MPEG-4 (H.264), the video may already be chunked in one sense. These chunks may be delineated by i-frames, P-frames, and B-frames. I-frames may be compressed versions of raw data from a single frame, while P- and B-frames may be compressed based on predictions relative to their neighboring frames. As such, given the implementation of video encoding and compression software, i-frames may typically appear at significant visual changes in the content of a video stream, and may be referred to as "scene changes." Such scene changes may naturally be appropriate locations at which to chunk the video stream for analysis similar to that done with audio chunks.

According to certain aspects, the i-frames may thus naturally occur when the individual authorized to use the terminal equipment positions the camera or himself in such a way that the camera no longer captures his face, but instead captures his surroundings, another individual, or some object which he intends to share using the video stream, such as a photograph, drawing, or other object. In the case where no such changes in the scene occur at or around an i-frame, the use of an i-frame by the automated video encoding and compression technique may instead indicate moderate to significant movement of the original individual's face within the camera's field of view. In this case, the time between adjacent i-frames may also be less than is typical during the rest of the video stream. Hence, a video chunk created beginning several seconds before the first i-frame in question, and ending after the next i-frame or after the last i-frame at such an increased frequency, may serve to capture a segment of video comprising of multiple headshot frames of sufficiently multiple angles so as to provide an accurate source for comparison against the still images and video captured during enrollment.

In some aspects, as with the analysis of the audio streams, the video chunks may be compared in a pairwise fashion to one or more of those on file for the individual indicated from the authentication/sign-on process as currently using the terminal equipment from which the video was captured, for the purposes of (1) ensuring that the individual is still the one using the terminal equipment (even if for a non-video purpose such as using the secure social network), (2) for identifying the individual using the terminal equipment when a face that is not the original authorized individual is detected in-frame, and (3) cataloging all unique individuals that participate in a communication who are not originally authorized to do so, for the purpose of building a searchable database of persons-of-interest.

According to certain aspects, several comparisons may be made using the separate voice and facial recognition methods described above. First, the most likely identification of the voice and face recognition tests for one or more pairs of time-matched-chunks may be compared. If their likely IDs do not match, that segment of the conversation may be flagged for investigators. Second, if in any similar pair of time-matched voice/video chunks, there is any voice recognized, but no face is recognized, these sections may also be flagged for review by investigators.

In some aspects, when the analysis of the frames at and around the chunk boundaries indicates that the percentage of skin tones increases, or when multiple areas of skin tones are detected, the chunks may then be analyzed for the two potential cases of multiple faces and of nudity. In some aspects, when the analysis of the frames at and around these chunk boundaries indicates that no face is present (such as when the percentage of skin tones decreases below a given threshold), the chunks may then be analyzed for inanimate objects and elements, such as hand signs, tattoos, drawings, furniture, typed or handwritten notes, images of computer screens, among many other possibilities. Such chunks may automatically be flagged for review by an investigator, or may be automatically excluded from transmission to the other party or parties on the video visitation.

According to various aspects of the subject technology, systems and methods for selecting segments of conversations to analyze are provided. As some of the comparison tests are compute-intensive, and only a percentage of all communications sessions is likely to contain prohibited or otherwise problematic communication (and even of those, only a portion of the entire communication session will exhibit such traits), it is not necessary to analyze the whole of each and every communication session, although this may be done according to aspects of the subject technology. Thus, according to certain aspects, the initial and final segments of each conversation may be analyzed, along with a given pattern of the remaining session. This pattern may be fixed, as in the first 15 seconds of every 60 seconds, for example, or random, as in 15 seconds every so often as determined by random or pseudo-random calculations.

In some aspects, the system may offer an investigator the ability to review a limited number of recorded conversations in their entirety, based on a random sample or an automated analysis, such as the 10 communications sessions with the greatest number, or greatest density over time, of automatically generated flags for suspicious issues. The investigator may then further categorize actual issues of concern in these communications sessions, and the system may then use a statistical analysis of the distribution of these events in the sample of communications to bias the selection of audio and video chunks to analyze, at least by default, on all other communications sessions at that facility. The reasoning behind this is that any given group of inmates may, by their nature, typically favor the beginning, middle, or end of a conversation in which to conduct activities they either know or suspect are illegal, otherwise prohibited, or of interest to investigators.

In some aspects, the call may be analyzed from the end to the beginning (e.g., in reverse order). The reasoning behind this is that inmates participating in suspicious communications may end the communication session shortly or immediately after the relevant information has been passed or business conducted, and therefore this reverse-order processing will produce more useful results for investigators than analyzing the communication in the forward direction, even if the entire communication is not analyzed.

According to various aspects of the subject technology, analysis may be performed on uploaded and/or captured photographs and/or videos. Video scenes blocked from transmission during a remote video visitation using the above-described techniques, along with some or all photos and video clips uploaded by any party, may be placed in a review queue for investigators to review at a later time. In some aspects, between the time that the media is captured and/or archived and when they are viewed by an investigator, the media may be automatically analyzed using the above-described techniques used to identify individuals.

According to various aspects of the subject technology, biometrics may be used for some or all system logins. The above-described enrollment of inmates and friends and family members may preferably be extended to all facility staff and law-enforcement officials that work at or enter a facility. These enrollments may be preferably used to enhance the security of the facility staff and law-enforcement officials' logins to the Inmate Telephone Service (ITS) and/or Video Visitation Service (VVS) administration and investigative services, either from one of the service's telephones, audio/video kiosks, and/or from a computing device suitably equipped with audio and video capture devices. In some aspects, the universal enrollment of all persons who work at the facility may also allow these individuals' biometric credentials to verify their identities when contacting the service's customer service agents, for example, to make a request that one or more devices be disabled, or other requests of an administrative or investigative nature, so as to prevent inmates or other unauthorized individuals from using facility staff's credentials.

In some aspects, the universal enrollment of all persons who work at the facility may also allow the system to detect and alert investigators to many other types of disallowed and otherwise problematic communications, such as, for example, inmate-to-staff communications and/or inmate-to-customer service staff. In the former case, inmates frequently contact or attempt to contact correctional officers and other staff, especially corrupt or corruptible ones, for the purposes of arranging drug deals and other illegal activity within the secure facility, for sending messages to other criminals, and for conducting other manner of criminal activity. In the latter case, inmates frequently try to contact the present system's customer service staff, who are intended to support only facility staff and friends and family members' support needs, and are prohibited from communicating with inmates. To detect such communications, all communications occurring on the ITS or VVS system are processed using the described voice and facial recognition for occurrences of correctional officers, facility staff, or other persons whom no inmate in general should be communicating with. According to certain aspects, the same detection system may be used to build a list of all persons who have called customer service multiple times within a specified time period. Such calls may be made frequently in the case where the individual wishes to speak with a particular customer service agent, who is either corrupt and willing to participate in unauthorized activities, or who has a greater propensity than other customer service agents to issue refunds or perform other actions favorable to the caller.

Aspects of the subject technology can also be used for fraud detection. For instance, individuals who purchase calling services with stolen credit cards may do so repeatedly. Upon one of these purchases being marked by a customer service agent or administrator as fraudulent, the system may alarm all future calls containing the same voiceprint as used for the initial fraudulent purchase, and either block the call or alert the customer service agent of the previous suspected or actual fraud. According to certain aspects, when the system detects multiple different voices originating from one outside source (e.g., one telephone number, either in entirely separate communication sessions or during the same communication session), the system may group these separate voices as being possibly more than one individual either residing or working at the same address (e.g., in the case of a land-line), or sharing a cell phone. During subsequent calls, the set of voiceprints associated with this contact address (e.g., phone number) may be used as the first comparison group, thereby speeding up the speaker recognition as compared with comparing against a wider set of voice prints.

According to various aspects of the subject technology, inmates may be tracked after release. The same or similar procedures described above may be used to detect the case where an inmate assumes one or more aliases upon release from the secure facility, and uses one or more of those aliases to establish a friend and family account with the ITS and/or VVS system, for the purpose of communicating with fellow inmates who are still incarcerated, or others using our system. Such detection schemes may be similarly performed over an initial period, and may be done over the initial period for all newly enrolled friends and family members using the ITS and/or VVS systems. As with the inmates, such analysis is performed without the subject's knowledge, so as to avoid causing them to change their contact or funding behavior, thus maintaining activity of use to facility investigators.

In some aspects, upon detecting likely matches of a friend and family member to a former inmate, the system may again present the possible matches to a facility investigator, who may then take one or more of several actions upon confirmation:

blocking the account from using the system entirely, if the individual is prohibited from contact with existing inmates;

allowing interactions to continue, so as to build up additional evidence against the former inmate and/or current inmates (e.g., such interactions may preferably be alarmed so that investigators are notified prior to or at the start of each communication, and be given the opportunity to reject or monitor the communication); and/or merging the newly created friend and family profile details back into the individual's inmate profile, so as to preserve a continuous profile for the individual. This profile may then be used the next time the inmate is incarcerated at a facility using the same ITS or VVS system.

According to various aspects of the subject technology, biometrics, physical description, and communication patterns (e.g., including called numbers, persons depositing funds, deposit amounts, etc.) may be used to associate multiple inmate records that may be for the same person. In some aspects, one use of the subject technology may be a case where an arrestee that has no ID and will not provide a name, is tied through biometrics or communication patterns to two other individuals who have previously been arrested at other facilities. All three individuals may in fact be the same person.

Figure 20:
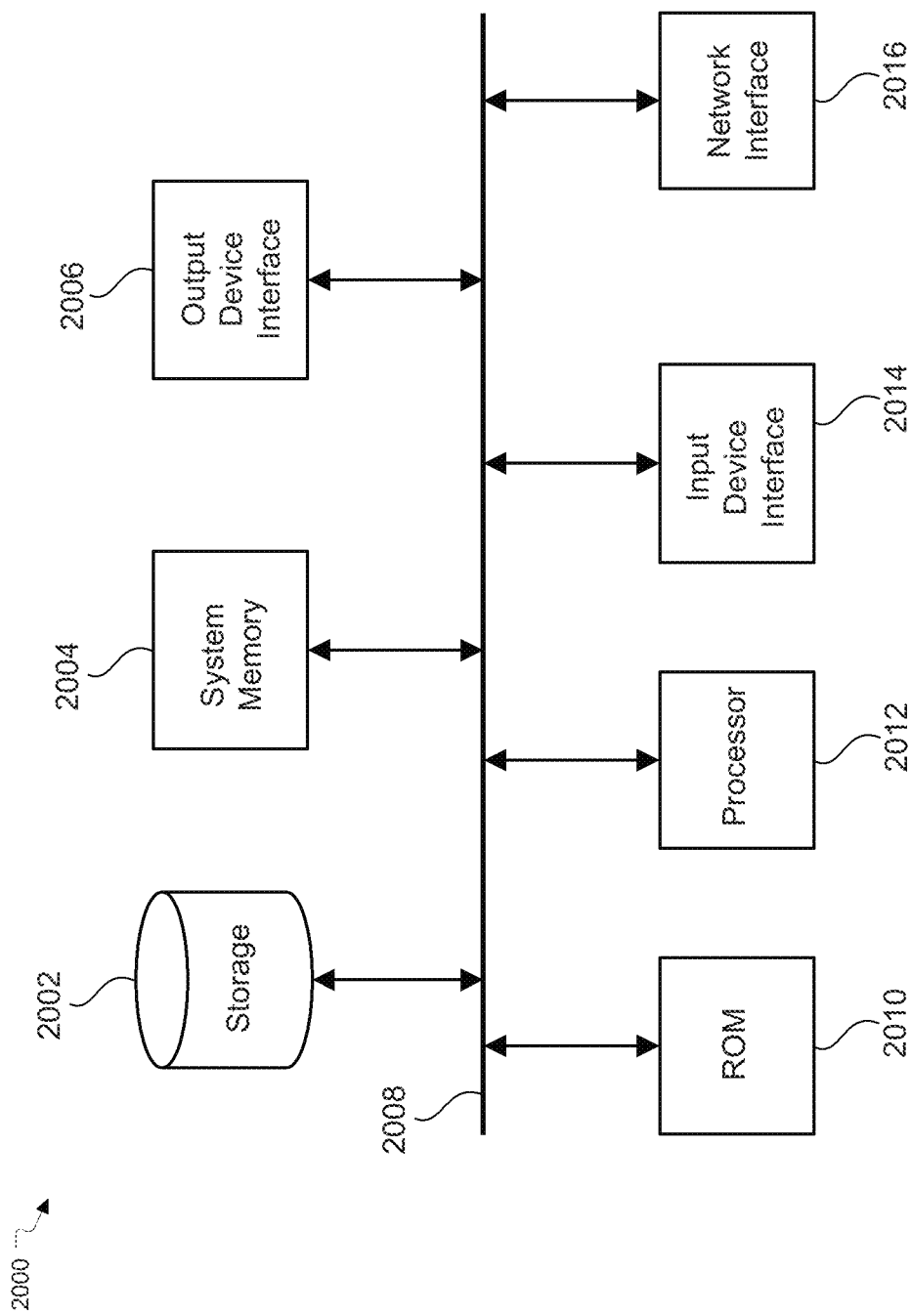
FIG. 20 conceptually illustrates an electronic system with which implementations of the subject technology may be implemented.

FIG. 20 conceptually illustrates electronic system 2000 with which implementations of the subject technology may be implemented. Electronic system 2000, for example, can be a desktop computer, a laptop computer, a tablet computer, a server, a switch, a router, a base station, a receiver, a phone, a personal digital assistant (PDA), any device that facilitates the secure communications described herein, or generally any electronic device that transmits signals over a network. Such an electronic system includes various types of computer readable media and interfaces for various other types of computer readable media. Electronic system 2000 includes bus 2008, processing unit(s) 2012, system memory 2004, read-only memory (ROM) 2010, permanent storage device 2002, input device interface 2014, output device interface 2006, and network interface 2016, or subsets and variations thereof.

Bus 2008 collectively represents all system, peripheral, and chipset buses that communicatively connect the numerous internal devices of electronic system 2000. In one or more implementations, bus 2008 communicatively connects processing unit(s) 2012 with ROM 2010, system memory 2004, and permanent storage device 2002. From these various memory units, processing unit(s) 2012 retrieves instructions to execute and data to process in order to execute the processes of the subject disclosure. The processing unit(s) can be a single processor or a multi-core processor in different implementations.

ROM 2010 stores static data and instructions that are needed by processing unit(s) 2012 and other modules of the electronic system. Permanent storage device 2002, on the other hand, is a read-and-write memory device. This device is a non-volatile memory unit that stores instructions and data even when electronic system 2000 is off. One or more implementations of the subject disclosure use a mass-storage device (such as a magnetic or optical disk and its corresponding disk drive) as permanent storage device 2002.

Other implementations use a removable storage device (such as a floppy disk, flash drive, and its corresponding disk drive) as permanent storage device 2002. Like permanent storage device 2002, system memory 2004 is a read-and-write memory device. However, unlike storage device 2002, system memory 2004 is a volatile read-and-write memory, such as random access memory. System memory 2004 stores any of the instructions and data that processing unit(s) 2012 needs at runtime. In one or more implementations, the processes of the subject disclosure are stored in system memory 2004, permanent storage device 2002, and/or ROM 2010. From these various memory units, processing unit(s) 2012 retrieves instructions to execute and data to process in order to execute the processes of one or more implementations.

Bus 2008 also connects to input and output device interfaces 2014 and 2006. Input device interface 2014 enables a user to communicate information and select commands to the electronic system. Input devices used with input device interface 2014 include, for example, alphanumeric keyboards and pointing devices (also called "cursor control devices"). Output device interface 2006 enables, for example, the display of images generated by electronic system 2000. Output devices used with output device interface 2006 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 20, bus 2008 also couples electronic system 2000 to a network (not shown) through network interface 2016. In this manner, the computer can be a part of a network of computers (such as a local area network ("LAN"), a wide area network ("WAN"), or an Intranet, or a network of networks, such as the Internet. Any or all components of electronic system 2000 can be used in conjunction with the subject disclosure.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description, including or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for enhancing facial recognition accuracy, the method comprising:
   initiating, by a first device comprising a camera and a display screen on a kiosk, an interactive session with a first user;
   directing the first user to interact with multiple elements spaced apart from each other on the kiosk or the display screen, such that the first user is instructed by information indicated by the multiple elements and is positioned in front of the camera at a plurality of different angles relative to the camera;
   capturing, with the camera, a photo of the first user and a barcode adjacent to the first user; and
   performing facial recognition of the first user based on comparing a stored profile photo associated with the captured barcode with the captured photo of the first user,
   wherein the directing the first user comprises directing the first user to locate, read or describe at least one of numbers, letters, strings of text, and colored shapes shown on the kiosk.

2. The method of claim 1, the method further comprising:
   capturing, with the camera, a plurality of images of the first user when the first user is interacting with each respective one of the multiple elements and positioned at each respective one of the plurality of different angles, wherein the directing the first user comprises at least one of:
   arranging a first interactive object to be on an edge of the display screen;
   arranging a second interactive object and a third interactive object to be on different sides of the display screen;
   sizing a fourth interactive object to be less than a predetermined percentage of the display screen, the predetermined percentage being less than five percent;
   moving a fifth interactive object across the display screen;
   requesting the first user to interact with a sixth interactive object on the display screen for calibration; and
   requesting the first user to interact with a body of the first device.

3. The method of claim 2, wherein the directing the first user comprises generating, by a second device different from the first device, an attention event to obtain the first user's attention.

4. The method of claim 3, wherein the second device is in the same building as the first device.

5. The method of claim 3, wherein the attention event comprises at least one of an audio playback by the second device, an image playback by the second device, a video playback by the second device, a light emission by the second device, and a movement by the second device.

* * * * *